US011816452B2

(12) United States Patent
Stein et al.

(10) Patent No.: US 11,816,452 B2
(45) Date of Patent: Nov. 14, 2023

(54) NATIVELY-INTEGRATED APPLICATION CONTENT CUSTOMIZATION FOR ENTERPRISES

(71) Applicant: Microsoft Technology Licensing, LLC, Redmond, WA (US)

(72) Inventors: Jesse H. Stein, Seattle, WA (US); Brian H. Burks, Duvall, WA (US); Lu Han, Redmond, WA (US); Shilpi Sinha, Bellevue, WA (US); Antoine Haas, Seattle, WA (US); Gaurav Bindlish, Redmond, WA (US); Srinivasa Raghavan Santhanam, Bellevue, WA (US); Harish Jayanti, Redmond, WA (US); Brent E. Ford, Issaquah, WA (US); Cristian M. Matesan, Redmond, WA (US); Willis Fung, Bellevue, WA (US); Sarvesh Surana, Bellevue, WA (US); Ling-Ya Huang, Bellevue, WA (US); Magdalena Dakeva, Marietta, GA (US); Peter John Richards, Snoqualmie, WA (US); Fengna Gu, Bellevue, WA (US); Andrew N. Dwersteg, Seattle, WA (US); Julio Cesar Gutierrez, Orlando, FL (US); Abhishek Mondal, Sammamish, WA (US); William P. Dinkuhn, Kenmore, WA (US); Shiyuan Zhao, Redmond, WA (US); Jonathan I. Reyes Spezzia, Seattle, WA (US); Woo Ram Lee, Kirkland, WA (US); Aayushi Chowdhary, Issaquah, WA (US); Conner Brennick, Bothell, WA (US); Khushi Hitendra Patel, Redmond, WA (US); Michael J. Krejcik, Seattle, WA (US); Amber Jerica McRae, Laurel, MD (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/713,081

(22) Filed: Apr. 4, 2022

(65) Prior Publication Data

US 2023/0315398 A1 Oct. 5, 2023

(51) Int. Cl.
*G06F 8/10* (2018.01)
*G06F 3/04847* (2022.01)

(52) U.S. Cl.
CPC ............ *G06F 8/10* (2013.01); *G06F 3/04847* (2013.01)

(58) Field of Classification Search
CPC ............................... G06F 8/10; G06F 3/04847
(Continued)

(56) References Cited

U.S. PATENT DOCUMENTS 6,311,194 B1 * 10/2001 Sheth ...................... G06F 16/38
715/236
7,287,230 B2 * 10/2007 Austin ................... G06F 3/0481
717/109

(Continued)

FOREIGN PATENT DOCUMENTS

WO      2017156435 A1     9/2017

OTHER PUBLICATIONS

Rivera, "The Effect of Content Customization on Learnability and Perceived Workload", ACM, pp. 1749-1752 (Year: 2005).*
(Continued)

*Primary Examiner* — Anil Khatri
(74) *Attorney, Agent, or Firm* — Barta, Jones & Foley, PLLC

(57) ABSTRACT

Systems and methods for providing enterprise-level application content customization are described herein. A method includes executing an enterprise application (from a suite of enterprise applications that are utilized by the enterprise) on a remote computing system operated by an enterprise administrator. The method includes surfacing a content customization UI on a display device of the remote computing system during execution of the enterprise application. The content customization UI includes UI elements that enable the specification of parameters for providing enterprise-specific customized content during execution of enterprise application(s) from the suite of enterprise applications (Continued)

on remote computing system(s) operated by enterprise user(s). The method also includes receiving, via the content customization UI, user input including the specification of parameters and generating the customized content based on the specified parameters. The method further includes surfacing the customized content on display device(s) of the remote computing system(s) during execution of the enterprise application(s).

19 Claims, 21 Drawing Sheets

(58) Field of Classification Search
USPC .................................................. 717/109–121
See application file for complete search history.

(56) References Cited

U.S. PATENT DOCUMENTS

| | | | | |
|---|---|---|---|---|
| 7,305,656 | B2* | 12/2007 | Fish | G06F 8/20 717/121 |
| 7,703,073 | B2* | 4/2010 | Illowsky | G06F 9/542 717/121 |
| 7,917,839 | B2* | 3/2011 | Joshi | G06F 9/451 717/109 |
| 8,387,039 | B2* | 2/2013 | Goring | G06F 8/20 717/121 |
| 8,601,490 | B2* | 12/2013 | Sureshan | G06Q 10/067 717/136 |
| 8,745,583 | B2* | 6/2014 | Ronen | G06F 16/90 717/125 |
| 8,788,935 | B1* | 7/2014 | Hirsch | G06F 8/10 717/106 |
| 8,819,659 | B2* | 8/2014 | Ramer | G06F 16/2428 717/109 |
| 8,924,470 | B2* | 12/2014 | Krahulec | G06F 16/972 719/329 |
| 9,465,529 | B1* | 10/2016 | Krivopaltsev | G06F 9/451 |
| 10,019,731 | B1* | 7/2018 | Wu | G06Q 30/0246 |
| 10,977,220 | B2* | 4/2021 | Kaufman | G06F 16/20 |
| 11,113,717 | B2 | 9/2021 | Kohareswaran et al. | |
| 11,226,803 | B2 | 1/2022 | Jayabalan et al. | |
| 11,250,347 | B2 | 2/2022 | Cai et al. | |
| 11,755,816 | B1* | 9/2023 | Mason | G06F 40/166 715/234 |
| 2013/0212487 | A1 | 8/2013 | Cote | |
| 2019/0373331 | A1 | 12/2019 | Benzatti et al. | |
| 2020/0251111 | A1* | 8/2020 | Temkin | G10L 15/22 |
| 2021/0026626 | A1 | 1/2021 | Jain et al. | |

OTHER PUBLICATIONS

Gunawan et al, "Enterprise Architecture for Cloud-based ERP System Development", IEEE, pp. 57-62 (Year: 2014).*

Nordheim et al, "Customization of Enterprise Content Management Systems: An Exploratory Case Study", IEEE, pp. 1-9 (Year: 2004).*

Whittinghill et al, "Teaching Enterprise Application Development: Strategies and Challenges", ACM, pp. 221-225 (Year: 2011).*

Rabiser et al, "Three-level Customization of Software Products Using a Product Line Approach", IEEE, pp. 1-10 (Year: 2009).*

"Messages.json", Retrieved from: https://web.archive.org/web/20210806123008/https://developer.yammer.com/docs/messages-json-post, Aug. 6, 2021, 6 Pages.

"5 Ways to Make Customers Feel Valued!", Retrieved from: https://supplychaingamechanger.com/5-ways-to-make-customers-feel-valued/, Jul. 15, 2020, 7 Pages.

"In-App Messaging and Guides—Personalize and Simplify the Product Experience", Retrieved from: http://web.archive.org/web/20180306060350/https://www.pendo.io/product/features/in-app-messaging-guides/, Mar. 6, 2018, 4 Pages.

"Onboarding Techniques to Impress your Users", Retrieved from: https://medium.com/@CanvasFlip/onboarding-techniques-to-impress-your-users-c087d9cf6928, Jul. 3, 2017, 6 Pages.

"The Difference between Google RCS Business Messaging and Google's Business Messages", Retrieved from: https://web.archive.org/web/20210614083158/https:/quiq.com/blog/difference-between-google-rcs-business-messaging-and-googles-business-messages/, Jun. 14, 2021, 22 Pages.

"What is In-Product Messaging and How Do You Create It? (code-free!)", Retrieved from: https://userpilot.com/blog/what-is-in-product-messaging/, Nov. 16, 2021, 30 Pages.

Manwaring, Emily, "Using Lightweight In-App Messaging Solutions for Embedded Assistance", In Proceedings of the 35th ACM International Conference on the Design of Communication, Aug. 11, 2017, 6 Pages.

"International Search Report and Written Opinion Issued in PCT Application No. PCT/US23/011666", dated Apr. 24, 2023, 11 Pages.

* cited by examiner

NATIVELY-INTEGRATED APPLICATION CONTENT CUSTOMIZATION FOR ENTERPRISES

BACKGROUND

The present disclosure relates to application content customization. In particular, the present disclosure relates to natively-integrated application content customization for enterprises.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method for enterprise-level application content customization is described. During the method, an enterprise application that is included within a suite of enterprise applications is executed on a remote computing system operated by an administrator associated with an enterprise. A content customization user interface (UI) is surfaced on a display device of the remote computing system during the execution of the enterprise application. The content customization UI includes UI elements that enable the specification of parameters for providing enterprise-specific customized content during the execution of one or more enterprise applications from the suite of enterprise applications on one or more remote computing systems operated by users associated with the enterprise. User input including the specification of the parameters for providing the enterprise-specific customized content is received via the content customization UI, and the enterprise-specific customized content is then generated in accordance with the specified parameters and surfaced on the display device(s) of the remote computing system(s).

In another embodiment, a server is described. The server includes a processor, a suite of enterprise applications that are utilized by an enterprise, a communication connection for connecting remote computing systems to the server via a network, and a computer-readable readable storage medium operatively coupled to the processor. The computer-readable storage medium includes computer-executable instructions that, when executed by the processor, cause the processor to execute the method described above.

In another embodiment, a computer-readable storage medium is described. The computer-readable storage medium includes computer-executable instructions that, when executed by a processor, cause the processor to execute the method described above.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
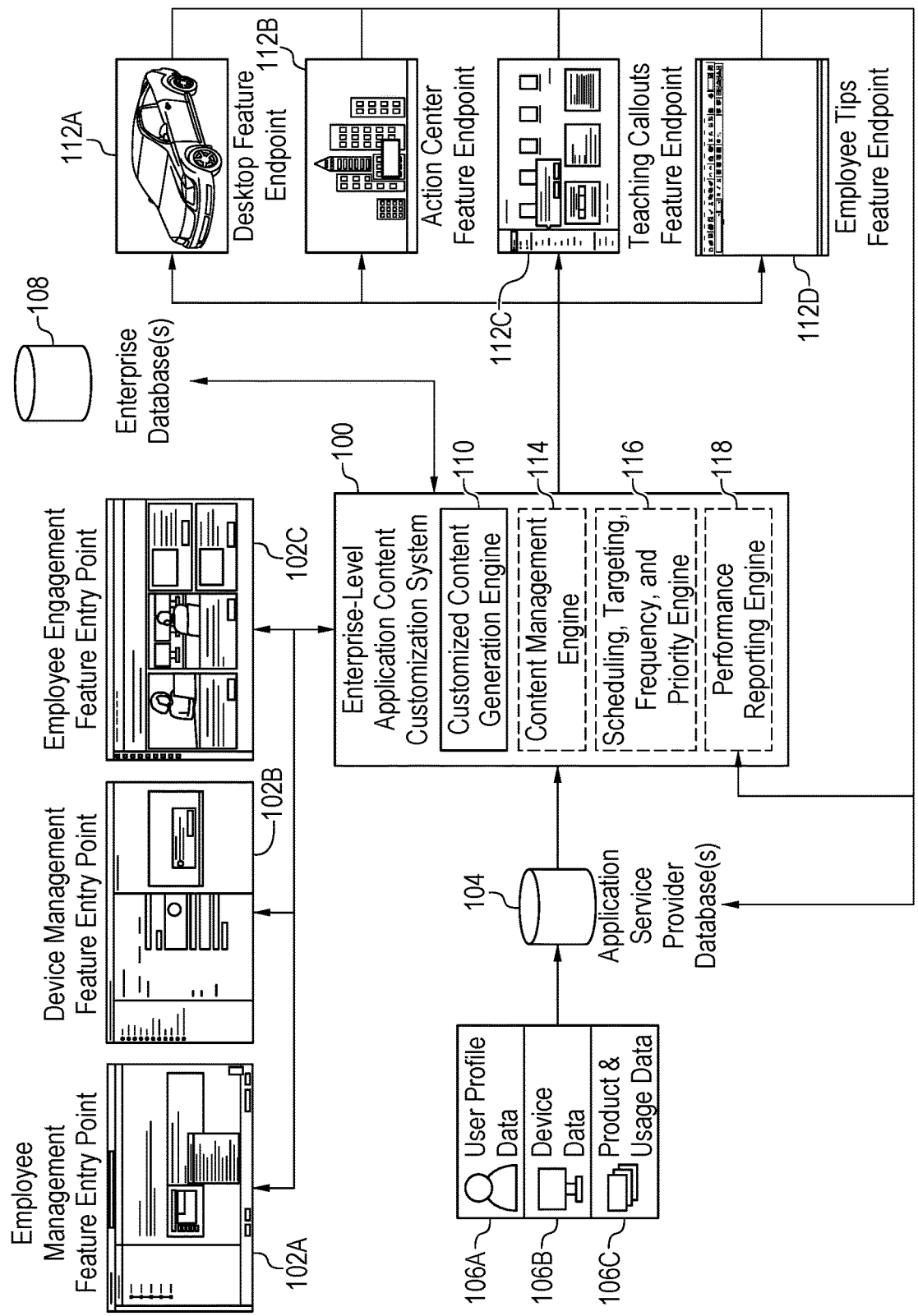
FIG. 1 is a simplified block diagram depicting the manner in which the enterprise-level application content customization system described herein is utilized to provide enterprise-specific customized content during the execution of enterprise applications on remote computing systems that are operated by users associated with an enterprise.

As a preliminary matter, some components shown in the figures are described herein in the context of one or more structural components, referred to as functionalities, modules, features, elements, etc. However, the components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," "client," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a computing system, the execution thereof causes, configures and/or adapts the executing computing system to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a computing system for execution via various transmission means and mediums, including carrier waves and/or propagated signals. However, for purposes of this disclosure, the term "computer-readable storage medium (or media)" refers specifically to non-transitory forms of computer-readable storage media and expressly excludes carrier waves and/or propagated signals.

The shift to remote work has increased the pace of digital transformation and put a spotlight on the need for enterprises (e.g., organizations, companies, and/or other entities) to effectively communicate with their employees and to provide tailored corporate experiences. A comprehensive communication strategy is the backbone of a digital workplace and ensures that employees have the information required to be productive and to feel engaged at work. More specifically, employees benefit from effective communication in several ways, including, for example, enabling employees to be guided through new employee orientation and/or new device setup, teaching employees about leadership goals and communication skills, and increasing employees' productivity through timely tips and feedback.

However, such comprehensive communication strategies are still lacking. According to current communication systems, content is provided in a non-native, external, and intrusive manner (e.g., via the installation of a separate application or tool). Moreover, the supported content is very limited in form factor, typically only encompassing pop-up notifications, emails, and/or chat messages. Furthermore, the supported content is limited in reach, with current systems generally only supporting external notifications and not engaging with users within the context of their overall productivity suite or application platform.

Therefore, the present techniques address these and other issues by providing a natively-integrated content customization system for enterprise applications. The system will deliver customized (or personalized) experiences in real-time (and/or near-real-time) for enterprises, spanning channels from in-product messaging, mobile, and email, for example. In particular, the system supports the creation of custom experiences, cross-surface coordination of content, rich audience targeting, experimentation, and deep insights around reach and/or impact.

The content customization system described herein enables third parties, e.g., particular enterprises, to generate various types of highly-customized content corresponding to the enterprise applications provided by an application service provider. In other words, while current communication systems generally provide enterprises with limited ability to change or modify in-app content and messaging, the present techniques enable enterprises to create highly-relevant, highly-specific, enterprise-specific content that is delivered to their employees in real-time (and/or near-real-time) and in a fully-compliant manner during the execution of an entire suite of enterprise applications.

Moreover, the custom experiences are natively integrated into the application suite or platform that is utilized by the enterprise, allowing the customized content to be delivered via any number of different enterprise applications that are supported by the platform. Notably, as used herein, the term "enterprise application" refers to any suitable types of web-based applications, mobile applications, operating systems, and/or other applications/services that are provided by the application service provider. In general, the term "enterprise application" is used herein with reference to an application that forms part of a suite or package of products/services (or some subset of such suite/package) that is provided by the application service provider to enable users who are associated with an enterprise to interact with their corresponding computing systems to perform tasks relating to the enterprise. As a non-limiting example, if the application service provider is Microsoft Corporation, the enterprise applications described herein may include (but are not limited to) the Microsoft® Windows® operating system (e.g., Windows 11®), as well as any number of other Microsoft applications, including (but not limited to) Microsoft® Viva®, Microsoft® Excel®, Microsoft® Word®, Microsoft® Teams®, Microsoft® PowerPoint®, Microsoft® Outlook®, Microsoft® OneNote®, Microsoft® OneDrive®, Microsoft® SharePoint®, and/or Microsoft® Yammer® (among others). For example, in some embodiments, the customized content is provided with respect to the entire suite of Microsoft 365® applications (or some subset thereof). More generalized examples of suitable enterprise applications include (but are not limited to) email/communication applications, social networking applications, employee experience applications, calendar applications, presentation applications, word processing applications, and the like. In other words, the techniques described herein may be implemented within the context of a broad range of web-based applications, mobile applications, operating systems, and/or additional applications/services that are utilized for enterprise-related tasks.

Furthermore, according to embodiments described herein, at least a portion of the data that are utilized for performing the techniques described herein are derived from one or more property graphs, such as, for example, Microsoft® Graph. In various embodiments, such property graph(s) include enterprise-specific data that are maintained by the application service provider. Such enterprise-specific data may include data objects (and metadata) relating to various types of enterprise resources, such as, for example, data objects relating to users, teams, chats, tasks, insights, coworkers, groups, calendars, files, messages, meetings, people, devices, learning, and/or positions corresponding to the particular enterprise. In addition, in various embodiments, the property graph(s) include enterprise-specific data that are provided by the enterprise itself. Such enterprise-specific data may include data objects (and metadata) relating to logos, strings, links, structural/organizational information (e.g., information regarding administrators, employees, job titles, departments, and the like), and/or other types of enterprise resources that are maintained by the enterprise (e.g., in the enterprise's own database(s)). Moreover, in various embodiments, the property graph(s) further include data objects relating to telemetry that is owned and maintained by the application service provider. As a non-limiting example, such data objects may relate to key performance indicators (KPIs) corresponding to the customized content that is generated according to embodiments described herein, where such KPIs may include, for example, interactions with the customized content and/or click-through data (e.g., the click-through rate) corresponding to the customized content. Furthermore, according to embodiments described herein, the data derived from the property graph(s) are used to drive and/or enhance the custom experiences provided by the enterprise-level application content customization system described herein, where such experiences are tailored to the goals of the particular enterprise. Notably, the content customization system described herein is uniquely designed to provide such custom experiences via the (optional) integration of the application service provider's own extensive data resources with data resources that are shared by the enterprise itself.

In various embodiments, providing the communication capabilities described herein within the enterprise setting enables enterprises who utilize (or subscribe to) one or more enterprise applications (or, optionally, an entire suite or platform of such enterprise applications) to engage with their employees using their own customized communications as they onboard and thrive in their workplace. In particular, the system described herein enables enterprises to integrate their own customized, branded content and messages with various supported enterprise applications in a fully-compliant way. In various embodiments, the system described herein also provides enterprises with advanced targeting for their content and messages based (at least in part) on the enterprise-specific data derived from the property graph. In addition, in various embodiments, the system provides enterprises with advanced insights about the performance of their customized content (e.g., based on performance reports that are generated by the system, as described further herein). Moreover, the content customization system described herein empowers enterprises to use high-traffic, high-value in-app surfaces to deliver their own customized messages/communications (and/or other content).

According to embodiments described herein, there are multiple entry points that provide content customization user interfaces (UIs) to enable the implementation of the techniques described herein. As an example, in various embodiments, one or more content customization UIs may be provided as part of an employee engagement feature relating to an enterprise application (or suite of enterprise applications), including, for example, an employee experience application, such as, for example, Microsoft® Viva®. Such employee engagement feature may enable an administrator associated with an enterprise to curate, manage, and control employee communications for coherence and alignment to the enterprise's overall employee engagement strategy. Notably, the term "administrator" is used herein to refer to any user who is associated with a particular enterprise and has been tasked with furthering the dissemination of in-app, enterprise-specific customized content. For example, an "administrator" may include an employer, manager, information technology (IT) administrator, human resource (HR) manager, or employee communication team that is associated with the particular enterprise.

As another example, in various embodiments, one or more content customization UIs may be provided as part of a device management feature relating to an enterprise application (or suite of enterprise applications). One non-limiting example of a suitable device management feature is Microsoft Endpoint Manager (MEM), provided by Microsoft Corporation. In such embodiments, the content customization UI(s) may be geared towards providing employees with customized content within the context of onboarding and/or lifecycle management. For example, such customized content may be provided within the context of a lockscreen feature, a desktop feature, an out-of-box experience (OOBE) feature, a "Get Started" feature (also known as an "Organization Connection in Get Started" feature), a soft landing feature (e.g., the Windows® Anchored Tips feature), a teaching callout feature, an employee tips feature (e.g., Office® BizBar), and/or an action center feature (e.g., the Windows® Notifications feature) that is controlled and/or managed by the overarching device management feature. Furthermore, in such embodiments, the customized content may provide enterprises with the ability to engage, onboard, educate, and/or communicate with employees leveraging the data and experiences provided by the suite of enterprise applications.

As another example, in various embodiments, one or more content customization UIs may be provided as part of an employee management feature relating to an enterprise application (or suite of enterprise applications). One non-limiting example of a suitable employee management feature is the Microsoft 365® Admin Center (MAC), provided by Microsoft Corporation. In such embodiments, the content customization UIs may be geared towards providing enterprises with insights to measure progress towards the enterprise's digital transformation goals, as well as providing enterprises with in-app messaging channels (and/or other content) that enable enterprises to take concrete actions to engage with their employees to drive change. Such in-product messaging channels may provide targeted, timely, and in-context suggestions to maximize employees' usage of the enterprise application(s).

In various embodiments, the content customization UIs provided within the context of any of the application features described above (and/or any other suitable application features) enable the administrator to tailor the customized content to the enterprise's specific goals, including specifying message content, audience (i.e., targeting), scheduling, frequency, and/or priority parameters (among others). Moreover, in various embodiments, the content customization system itself is also configured to tailor the customized content to the particular enterprise and/or the particular users associated with the enterprise. This is facilitated, at least in part, via the utilization of a customer engagement platform experimentation framework that enables the content customization system to determine which variation of particular customized content (or a particular type of customized content, as defined by the user-specified parameters) is most effective for the particular enterprise. This customer engagement platform experimentation framework is described in U.S. Pat. No. 11,113,717 B2 to Kohareswaran et al., titled "Customer Engagement Platform Experimentation Framework," which is incorporated by reference herein in its entirety.

In various embodiments, the content customization system described herein is also configured to automatically provide cross-surface content coordination to prevent user over-messaging. In particular, the content customization system may automatically update or adjust the cadence for providing particular content across multiple end points within a single enterprise application or across multiple enterprise applications, while also accounting for the scheduling, frequency, and/or priority parameters specified by the administrator.

Furthermore, in various embodiments, the content customization UIs provided within the context of any of the application features described above (and/or any other suitable application features) enable the administrator to engage with the enterprise's employees (or other similar personnel) by generating customized and (optionally) branded messages (and/or other content) in contextual in-app surfaces, while still respecting user privacy. Accordingly, the present techniques enable enterprises who utilize the enterprise application(s) to communicate natively with their employees during the execution of the enterprise application(s). Furthermore, the content customization UIs enable the administrator to experiment with different types of customized content provided across various different surfaces or applications, as well as to receive feedback in the form of performance reports that provide insight into the efficacy and reach of the customized content across the specified audience base. In addition, the content customization UIs enable the administrator to modify, launch, pause, or cancel previously-generated customized content at any time via the dynamic content management feature that is provided by the content customization system.

In various embodiments, the content customization UIs described herein also provide various management functionalities for controlling the delivery of the customized content. For example, the application content customization system and corresponding content customization UI support a flush feature that enables the enterprise administrator who created the customized content to flush and delete such content from all client computing systems on demand and in near-real-time. This provides the administrator with flexibility to immediately terminate outdated and/or erroneous customized content that has already been pushed to client computing systems.

In various embodiments, the enterprise-level application content customization system includes a role-based access control (RBAC) feature that provides a complex permission structure for automatically controlling which users interact with particular aspects of the content customization system (e.g., by adjusting which UI elements are surfaced on the content customization UI) based, at least in part, on the users' roles within the corresponding enterprise. For example, the RBAC feature may allow a particular group of users to create and manage customized content for the enterprise (e.g., due to their classification as "administrators"), while allowing another group of users to view the customized content (e.g., due to their classification as "employees"). Moreover, those skilled in the art will appreciate that the RBAC feature can further divide users into any number of different categories or sub-categories based on various types of enterprise-specific data, depending on the details of the particular implementation.

In various embodiments, the enterprise-level application content customization system also provides cloud-controlled, two-layer security for generated enterprise-specific customized content by following a two-call pattern process that utilizes security tokens with automatic expiration times. As described herein, this two-call pattern process ensures that the enterprise-specific customized content is provided to remote computing systems in a manner that meets the compliance, security, and transparency expectations of enterprise customers.

The enterprise-level application content customization system described herein provides numerous advantages as compared to previous solutions. As an example, the content customization system is natively integrated into the enterprise applications (or suite of applications), allowing the customized content to be provided in real-time and in a contextually-relevant manner. At the same time, the system is non-intrusive and is included out-of-box within the enterprise applications, e.g., without requiring the installation of any additional applications or tools. As another example, the content customization system provides the ability to generate customized content across a wide range of device types, including (but not limited to) desktop computers, laptop computers, tablet computers, and/or mobile devices. As another example, the content customization system supports content in a myriad of different form factors, including (but not limited to) pop-up notifications, anchored pop-ups, banners, chat messages, spotlight icons, embedded UI elements, emails, and/or push notifications. As another example, the content customization system is configured for enhanced targeting of communications based on data (e.g., enterprise-specific data from a property graph) and telemetry that is maintained by the application service provider. For example, the application service provider may leverage application usage data to automatically target non-engaged users with engagement communications and/or may leverage enterprise-specific data to automatically target certain departments or teams within a particular enterprise. As another example, the content customization system supports differentiated reporting that goes beyond providing user-provided feedback and provides detailed productivity and usage-based metrics, thus allowing the corresponding enterprise to track the quantifiable impact of the customized communications. As yet another example, the content customization system enables enterprises to create and use customized and (optionally) branded communications including, for example, enterprise-specific logos, strings, images, and/or links to the enterprise's own proprietary resources (e.g., the enterprise website and/or internal, enterprise-specific applications and/or other tools). Furthermore, as yet another example, the content customization system enables exclusive coordination and governance of content/communications across a myriad of touchpoints within the suite of enterprise applications.

FIG. 1 is a simplified block diagram depicting the manner in which the enterprise-level application content customization system 100 described herein is utilized to provide enterprise-specific customized content during the execution of enterprise applications on remote computing systems that are operated by users associated with an enterprise. As depicted in FIG. 1, content customization UIs 102A, 102B, and 102C may be provided natively and in real-time across a number of different entry points within the suite of enterprise applications. Such entry points may include, but are not limited to, an employee management feature entry point (as represented by the first content customization UI 102A), a device management feature entry point (as represented by the second content customization UI 102B), and an employee engagement feature entry point (as represented by the third content customization UI 102C).

In various embodiments, such content customization UIs include a number of different UI elements that enable an administrator associated with the enterprise to specify parameters for providing enterprise-specific customized content during the execution of the enterprise applications (or some subset thereof) by users associated with the enterprise. In particular, such parameters may include defining or creating the customized content itself, as well as defining a scheduling policy, targeting policy, frequency policy, and/or priority policy for providing the customized content.

With respect to defining or creating the customized content, in some embodiments, the customized content may be created using one or more templates that are provided by the enterprise-level application content customization system 100. Such templates may be partially or fully customizable to the enterprise or may be pre-generated in a defined format using enterprise-specific data and telemetry that is stored within one or more application service provider databases 104. As described herein, such enterprise-specific data and telemetry may be stored (at least in part) with respect to a property graph that is maintained by the application service provider. In various embodiments, the enterprise-specific data may include (but are not limited to) user profile data 106A, device data 106B, and/or product and usage data 106C associated with the enterprise. Moreover, in various embodiments, the telemetry may include (but are not limited to) performance data, sometimes referred to as key performance indicators (KPIs), relating to the content customization system, where such data are maintained by the application service provider. Non-limiting examples of KPIs include data relating to users' interactions with various customized content, data relating to which types of customized content are created by which types of users, user click-through data (e.g., including the average click-through rate for particular types of customized content), and/or data relating to the comparative usage rates for the entry points and/or end points that are supported by the content customization system 100.

Additionally or alternatively, in some embodiments, the customized content is created (at least in part) by accessing or uploading highly-personalized content corresponding to the enterprise. In such embodiments, the enterprise-level application content customization system 100 may automatically provide suggestions for such highly-personalized content by utilizing the enterprise-specific data from the application service provider database(s) 104. Moreover, in various embodiments, the administrator uploads enterprise-specific data from one or more enterprise databases 108. As described herein, such enterprise-specific data may include (but are not limited to) data relating to enterprise-specific logos, strings, links, images, structural/organizational information (e.g., information regarding administrators, employees, job titles, departments, and the like), and/or other types of enterprise resources that are stored by the enterprise. In such embodiments, the uploaded enterprise-specific data from the enterprise database(s) 108 may be directly integrated with the enterprise-specific data and/or telemetry from the application service provider database(s) 104 to provide advanced suggestions or recommendations for creation and delivery of the customized content.

In various embodiments, defining the scheduling policy may include specifying a start date and an end date for delivering the customized content. Alternatively, defining the scheduling policy may include providing input that enables the content customization system to automatically determine a suitable schedule for delivering the customized content. As a non-limiting example, the administrator may specify that the customized content is to be provided in advance of a particular calendar event, and the content customization system may automatically access the enterprise calendar to determine suitable start and end dates for delivering the content.

In various embodiments, defining the targeting policy may include specifying parameters for determining a subset of the users associated with the enterprise who are to be targeted to receive the customized content. In such embodiments, this may include, for example, specifying a particular type or group of users (e.g., based on job title, group membership, or the like), specifying conditions for determining users to be targeted (e.g., users with particular skills, interests, or the like), listing specific users by username, specifying users based on the type of device being utilized (e.g., desktop versus mobile), or some combination thereof, depending on the details of the particular implementation. In some embodiments, the enterprise-level application content customization system 100 utilizes the enterprise-specific data described herein to automatically determine suitable users to be targeted by the targeting policy. In such embodiments, the content customization system 100 may then automatically set the targeting policy for the customized content, or the content customization system 100 may provide the administrator with tailored recommendations or suggestions for specifying the targeting policy via the corresponding content customization UI.

In various embodiments, defining a frequency policy may include specifying parameters for determining the rate of recurrence for surfacing the customized content during the execution of one of the enterprise applications (and/or across a number of the enterprise applications within the suite of applications). As a non-limiting example, the content customization UI may enable the administrator to easily specify the frequency policy as being once per day, twice per day, once per week, twice per week, or the like. Moreover, in some embodiments, the frequency policy may also define the rate of recurrence for surfacing the customized content in various different forms and/or across various different features of the application(s).

In various embodiments, defining the priority policy may include specifying a relative importance of the particular customized content. As a non-limiting example, the content customization UI may enable the administrator to easily specify the priority policy as being high priority, normal priority, or low priority.

Furthermore, in various embodiments, the content customization system 100 is configured to automatically implement a cross-surface content coordination feature that updates or adjusts the cadence for providing particular customized content across multiple end points within a single enterprise application, across multiple enterprise applications and/or across multiple device types, while also accounting for the scheduling, frequency, and/or priority policies specified by the administrator. In some embodiments, the cross-surface content coordination feature (or at least a portion thereof) is implemented using one or more machine learning techniques, such as, for example, supervised and/or unsupervised machine learning techniques. As will be appreciated by those skilled in the art, such cross-surface content coordination feature is particularly useful for preventing users from being inundated with repetitive content across various different applications, surfaces, and/or devices.

According to embodiments described herein, the enterprise-level application content customization system 100 includes a customized content generation engine 110 that is configured to utilize the specified parameters to generate and surface the enterprise-specific customized content natively and in real-time (and/or near-real-time) during the execution of the enterprise applications (or some subset thereof) on remote computing systems operated by users associated with the enterprise. In various embodiments, such customized content may be surfaced with respect to various application feature endpoints. For example, as depicted in FIG. 1, the customized content may be surfaced with respect to a desktop feature endpoint 112A, an action center feature endpoint 112B, a teaching callout feature endpoint 112C, and/or an employee tips feature endpoint 112D. Additional endpoint examples for surfacing the customized content include, but are not limited to, a lockscreen feature, an OOBE feature, a "Get Started" feature, and/or a soft landing feature of any of the enterprise applications. Moreover, the customized content may be surfaced in various different form factors, including, for example, as pop-up notifications, anchored pop-ups, banners, icons, chat messages, embedded UI elements, emails, and/or push notifications. In some cases, the form factor for providing the customized content may vary depending on the particular enterprise application(s) for which it is being surfaced.

In some embodiments, the enterprise-level application content customization system 100 includes a content management engine 114 that is configured to, for example, protect and maintain the privacy and integrity of the data corresponding to the customized content. In particular, the content management engine 114 is configured to isolate the customized content itself, as well as the enterprise-specific data underlying the customized content, from other enterprises who utilize the suite of enterprise applications. In this regard, the content management engine 114 may be configured to parse the customized content data to separate data that is owned exclusively by the application service provider (e.g., data corresponding to templates and/or standard content creation options) from personalized and/or branded content that is owned by the enterprise, including, for example, the underlying enterprise-specific data (e.g., user profile data 106A, device data 106B, and/or product and usage data 106C) from the application service provider database(s) 104, as well as the enterprise-specific data from the enterprise database(s) 108.

In various embodiments, the enterprise-level application content customization system 100 also includes a scheduling, targeting, frequency, and priority engine 116 that is configured to enforce the scheduling, targeting, frequency, and/or priority policies for generating the customized content. In some embodiments, such policies are defined based on user input, as described above. However, in other embodiments, one or more of the policies are automatically generated and enforced by the scheduling, targeting, frequency, and priority engine 116 using, for example, machine learning techniques, such as, for example, supervised and/or unsupervised machine learning techniques. For example, the scheduling, targeting, frequency, and priority engine 116 may apply machine learning techniques (and/or any other suitable AI-based and/or non-AI-based techniques) to the enterprise-specific data to determine optimal scheduling, targeting, frequency, and/or priority policies for the particular enterprise. In such embodiments, the property graph maintained by the application service provider, which includes enterprise-specific data obtained across the entire suite of enterprise applications, provides extensive data to enable the implementation of such techniques. Moreover, in other embodiments, rather than utilizing such data to automatically generate and enforce the policies, the scheduling, targeting, frequency, and priority engine 116 may utilize such data to customize the scheduling-, targeting-, frequency-, and/or priority-related options that are surfaced via the corresponding content customization UI, thus further personalizing the experience to the particular enterprise.

In various embodiments, the customized content generation engine 110 and the scheduling, targeting, frequency, and priority engine 116 of the content customization system 100 are further enhanced via the underlying customer engagement platform experimentation framework. As described herein, such customer engagement platform experimentation framework enables the content customization system 100 to automatically determine which variation of particular customized content (or a particular type of customized content, as defined by the user-specified parameters) is most effective for the particular enterprise. In addition to determining the most effective variations of particular customized content, this may also include determining the most effective scheduling, targeting, frequency, and/or priority policies for the particular enterprise. Further details regarding the customer engagement platform experimentation framework are provided by U.S. Pat. No. 11,113,717 B2 to Kohareswaran et al., titled "Customer Engagement Platform Experimentation Framework," which is incorporated by reference herein in its entirety.

As a non-limiting example of the manner in which the content customization system 100 may partially automate the customization process, if the content customization system 100 determines that particular customized context is non-urgent (e.g., based on the user-specified content type and scheduling, frequency, and priority policies), the content customization system 100 may only refresh such content once per day, for example. However, if the content customization system 100 determines that particular customized context is urgent, the content customization system 100 may force fire such content multiple times per day, potentially across multiple form factors, multiple end points, multiple applications, and/or multiple device types. An example of non-urgent content may include a communication regarding generalized employee information, while an example of urgent content may include a calendar event invitation for an upcoming "all-hands" meeting.

Furthermore, in various embodiments, the enterprise-level application content customization system 100 includes a performance reporting engine 118 that is configured to track (e.g. collect and store) performance data (e.g., telemetry) relating to the surfacing of the customized content with respect to the various different form factors, endpoints, applications, and/or device types. Such performance data may include, for example, productivity data and/or usage-based metrics relating to the customized content. For example, as described herein, such performance data may include key performance indicator (KPI) data corresponding to the customized content. In various embodiments, the performance reporting engine 118 is also configured to generate performance reports based on the performance data and to surface such performance reports on the display device of the administrator's computing system. Such performance reports may allow the administrator to determine the quantifiable impact of the customized content and to modify or update the parameters for generating the customized content accordingly. Moreover, the enterprise-specific data and telemetry stored within the application service provider database(s) 104 may also be updated based on the performance data, providing feedback that can be used to continuously improve the functioning of the overall enterprise-level application content customization system 100.

In various embodiments, the customized content generated by the enterprise-level application content customization system 100 may be directed to a wide range of enterprise-specific purposes. As an example, an IT administrator of the enterprise may utilize the customized content for technology-related purposes, such as for providing tips/education for onboarding new devices, optional/mandatory device updates, recommendations for enterprise tools, and/or security warnings, for example. As another example, a business/product administrator of the enterprise may utilize the customized content for productivity-related purposes, such as for providing under-used product/feature recommendations, tool usage tutorials, insights on sustainable workflows, and/or custom outreach scenarios, for example. As another example, a human resources manager of the enterprise may utilize the customized content for HR-related purposes, such as for providing campus service change announcements, fiscal and/or company reports, leadership/organizational change announcements, new training programs, and/or benefit change announcements, for example. As yet another example, a workplace influencer associated with the enterprise may utilize the customized content for culture-related purposes, such as for driving excitement for new initiatives, awareness of team/company events, and/or awareness of company resources for lifestyle and wellness, for example.

According to embodiments described herein, the enterprise-level application content customization system 100 acts as a single, unified hub for creating and disseminating fully-customized content or communications across a wide range of surfaces that are supported by the entire productivity suite that is utilized by the enterprise. In other words, the content customization system 100 is natively integrated into the productivity suite such that administrators associated with the enterprise are able to quickly and efficiently provide the customized content to employees (and/or others associated with the organization) in real-time and in various different formats across a wide range of feature endpoints. Moreover, because performance telemetry is continuously collected and analyzed by the system 100, such customized content can be continuously updated and refined to more accurately meet the goals of the particular enterprise. Furthermore, the system 100 can be implemented across any platform that is capable of executing the enterprise application(s), including, for example, mobile, web, and/or desktop platforms.

Those skilled in the art will appreciate that the block diagram of FIG. 1 is not intended to indicate that the enterprise-level application content customization system 100 is to include all the elements shown in FIG. 1 in every case. In addition, the block diagram of FIG. 1 is not intended to indicate that the enterprise-level application content customization system 100 is limited to only the elements shown in FIG. 1. Furthermore, the block diagram of FIG. 1 is not intended to indicate that the techniques described herein are intended to be implemented in the exact manner depicted in FIG. 1 in every case. Rather, the exact implementation of the techniques described herein may vary depending on the details of each particular case, and FIG. 1 is only intended to provide an exemplary embodiment of the manner in which such techniques may be implemented.

Figure 2:
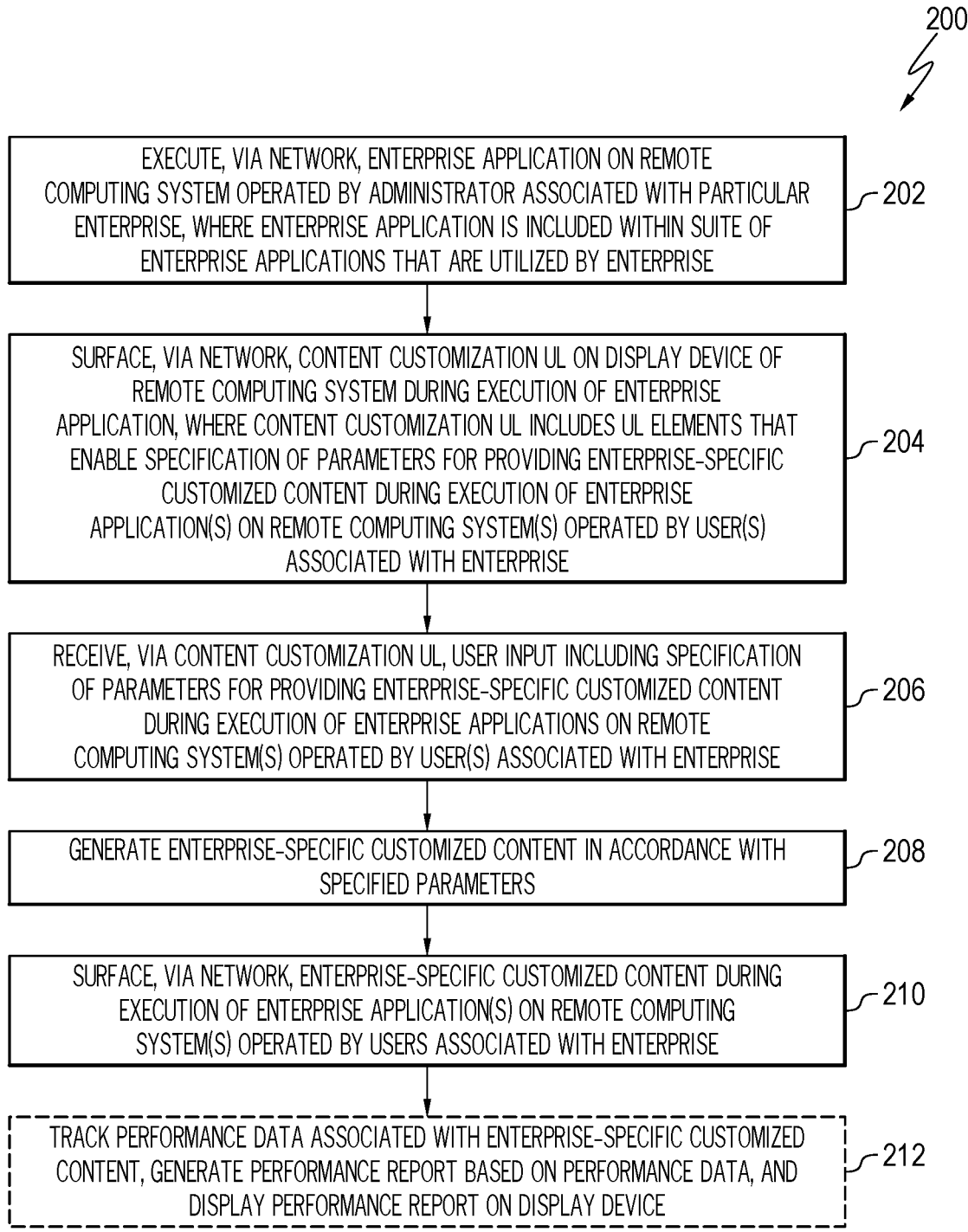
FIG. 2 is a process flow diagram of a method for providing natively-integrated application content customization for enterprises according to embodiments described herein.

FIG. 2 is a process flow diagram of a method 200 for providing natively-integrated application content customization for enterprises according to embodiments described herein. The method 200 is executed via one or more computing systems, such as the exemplary computing system described with respect to FIG. 3. In particular, in various embodiments, the computing system(s) implementing the method 200 includes computing system(s) or server(s) that are run by an application service provider who provides for the execution of a suite of enterprise applications on remote computing systems. The computing system(s) include one or more processors and one or more computer-readable storage media including computer-executable instructions that, when executed by the processor(s), cause the processor(s) to perform the blocks of the method 200. An exemplary embodiment of such computer-readable storage media is described with respect to FIG. 5. Moreover, in various embodiments, the method 200 is executed within the context of a network environment including one or more application service provider computing system(s)/server(s), as described further with respect to the exemplary network environment of FIG. 4.

The method 200 begins block 202, at which an enterprise application is executed, via the network, on a remote computing system operated by an administrator associated with an enterprise, where the enterprise application is included within the suite of enterprise applications that are utilized by the enterprise.

At block 204, a content customization user interface UI is surfaced, via the network, on a display device of the remote computing system during the execution of the enterprise application, where the content customization UI includes UI elements that enable the specification of parameters for providing enterprise-specific customized content during the execution of one or more enterprise application from the suite of enterprise applications on one or more remote computing system operated by users associated with the enterprise. In various embodiments, the content customization UI is surfaced on the display device via a suitable feature entry point, such as a device management feature entry point, an employee management feature entry point, and/or an employee engagement feature entry point that is supported by the enterprise application, depending on the details of the particular implementation. Moreover, in various embodiments, the customization options presented by the UI elements of the content customization UI are personalized to the particular enterprise based on enterprise-specific data and/or telemetry that are maintained by the application service provider (e.g., within one or more application service provider databases) and/or enterprise-specific data that are maintained by the enterprise (e.g., within one or more enterprise databases). In some embodiments, the enterprise-specific data and/or the telemetry that are maintained by the application service provider may be stored with respect to one or more property graphs, as described herein.

At block 206, user input is received via the content customization UI, where the user input includes the specification of the parameters for providing the enterprise-specific customized content during the execution of the enterprise application(s). Such parameters define various details regarding the customized content, including, for example, the type of content (e.g., templatized or "start-from-scratch"), the form factor(s) for delivering the content, and/or the text, images, and/or links to be included within the content. In addition, in some embodiments, the specified parameters define a targeting policy for generating and surfacing the enterprise-specific customized content with respect to a subset of the users associated with the enterprise. In such embodiments, the enterprise-specific data and/or telemetry may optionally be utilized to automatically determine the subset of the users to be targeted by the targeting policy or, alternatively, to automatically provide suggestions or recommendations for the targeting policy via the content customization UI. In some embodiments, the specified parameters additionally or alternatively define a scheduling policy, a frequency policy, and/or a priority policy for generating and surfacing the enterprise-specific customized content during the execution of the enterprise application(s).

In some embodiments, the method 200 also includes utilizing a customer engagement platform experimentation framework to automatically determine, via the processor(s) of the computing system(s) implementing the method 200, a portion of the parameters for providing the enterprise-specific customized content during the execution of the enterprise application(s). Additionally or alternatively, in some embodiments, the method 200 also includes utilizing the customer engagement platform experimentation framework to automatically adjust, via the processor(s), previously-specified parameters for providing the enterprise-specific customized content during the execution of the enterprise application(s).

At block 208, the enterprise-specific customized content is generated in accordance with the specified parameters. In various embodiments, the enterprise-specific customized content includes highly-personalized and/or branded content corresponding to the enterprise. At block 210, the generated enterprise-specific customized content is surfaced, via the network, on display device(s) of the remote computing system(s) during the execution of the enterprise application(s). In various embodiments, the customized content is surfaced via one or more suitable feature end points, such as a lockscreen feature end point, a desktop feature end point, an OOBE feature end point, a "Get Started" feature end point, an employee tips feature end point, a teaching callout feature end point, a soft landing feature end point, and/or an action center feature end point that is supported by the enterprise application(s). In addition, the customized content may be surfaced in any number of different form factors, such as, for example, one or more pop-up notifications, one or more anchored pop-ups, one or more banners, one or more chat messages, one or more icons, one or more embedded UI elements, one or more emails, and/or one or more push notifications. Moreover, in some embodiments, the method 200 includes automatically providing, via the processor(s), cross-surface content coordination during the surfacing of the enterprise-specific customized content across of multiple form factors, multiple endpoints, multiple enterprise applications, and/or multiple device types, as described herein. Furthermore, in some embodiments, the method 200 also includes receiving, via the content customization UI, additional user input including an adjustment of one or more parameters for providing the enterprise-specific customized content, as well as dynamically adjusting, via the processor, the generation and surfacing of the enterprise-specific customized content in accordance with the adjustment to the parameter(s). In such embodiments, receiving the additional user input may include receiving user input including a selection of a flush command for flushing and deleting the enterprise-specific customized content (or a portion thereof), and dynamically adjusting the generation and surfacing of the enterprise-specific customized content may include flushing and deleting the enterprise-specific customized content (or the portion thereof) from the remote computing system(s) in response to the selection of the flush command.

At optional block 212, performance data associated with the enterprise-specific customized content is tracked (e.g., collected and stored); a performance report corresponding to the performance data is generated; and the performance report is displayed on the display device of the remote computing system operated by the administrator associated with the enterprise. In some embodiments, user input including modified or updated parameters for providing the customized content may then be received via the content customization UI. Moreover, in some embodiments, the method 200 further includes utilizing the collected performance data to automatically update the parameters for providing the customized content. As an example, the performance data may be used to update the targeting policy for delivering the customized content (and/or future customized content) such that under-engaged and/or non-engaged users are targeted more efficiently. As another example, the collected performance data may be used as training data for one or more machine learning models, which are then used to improve the overall method 200.

The block diagram of FIG. 2 is not intended to indicate that the blocks of the method 200 are to be executed in any particular order, or that all of the blocks of the method 200 are to be included in every case. Moreover, any number of additional blocks may be included within the method 200, depending on the details of the specific implementation. For example, in various embodiments, the method 200 also includes maintaining the privacy of the enterprise-specific customized content in a manner that prevents other users associated with other enterprises that utilize any of the enterprise applications within the suite of enterprise applications from accessing the data associated with the enterprise-specific customized content. Furthermore, in various embodiments, the method 200 also includes implementing a two-call pattern process during the surfacing of the content customization UI and the surfacing of the generated enterprise-specific customized content. As described further herein, the two-call pattern process includes providing two layers of security for the enterprise-specific customized content.

Figure 3:
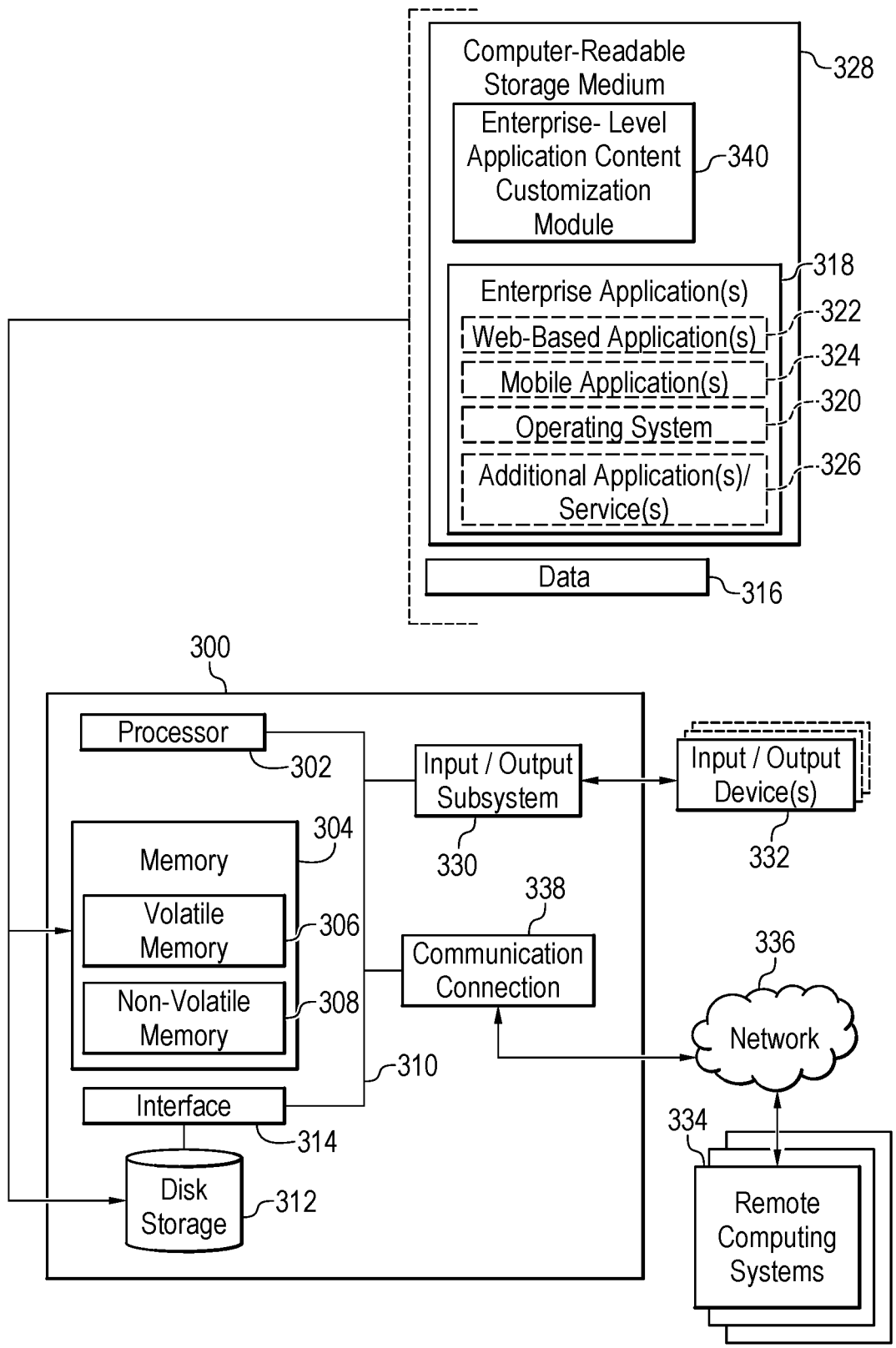
FIG. 3 is a block diagram of an exemplary computing system for implementing the enterprise-level application content customization techniques described herein.

FIG. 3 is a block diagram of an exemplary computing system 300 for implementing the enterprise-level application content customization techniques described herein. The exemplary computing system 300 includes a processor 302 and a memory 304. The processor 302 may include any suitable type of processing unit or device, such as, for example, a single-core processor, a multi-core processor, a computing cluster, or any number of other configurations. Moreover, the processor 302 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein.

The memory 304 typically (but not always) includes both volatile memory 306 and non-volatile memory 308. The volatile memory 306 retains or stores information so long as the memory is supplied with power. By contrast, the non-volatile memory 308 is capable of storing (or persisting) information even when a power supply is not available. The volatile memory 306 may include, for example, RAM (e.g., synchronous RAM (SRAM), dynamic RAM (DRAM), synchronous dynamic RAM (SDRAM), and the like) and CPU cache memory. The nonvolatile memory 308 may include, for example, read-only memory (ROM) (e.g., programmable ROM (PROM), electrically programmable ROM (EPROM), electrically erasable ROM (EEROM) or the like), flash memory, nonvolatile random-access memory (RAM), solid-state memory devices, memory storage devices, and/or memory cards.

The processor 302 and the memory 304, as well as other components of the computing system 300, are interconnected by way of a system bus 310. The system bus 310 can be implemented using any suitable bus architecture known to those skilled in the art.

According to the embodiment shown in FIG. 3, the computing system 300 also includes a disk storage 312. The disk storage 312 may include any suitable removable/non-removable, volatile/non-volatile storage component or device. For example, the disk storage 312 may include, but is not limited to, a magnetic disk drive, floppy disk drive, tape drive, Jaz drive, Zip drive, LS-210 drive, flash memory card, memory stick, or the like. In addition, the disk storage 312 may include storage media separately from (or in combination with) other storage media including, but not limited to, an optical disk drive, such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 312 to the system bus 310, a removable or non-removable interface is typically used, such as interface 314 shown in FIG. 3.

In various embodiments, the disk storage 312 and/or the memory 304 function as one or more databases that are used to store data 316 relating to the techniques described herein. Such data 316 may include, but are not limited to, enterprise-specific data (e.g., user profile data, device data, and/or product and usage data) and/or telemetry, which may be obtained from a property graph that is owned by an application service provider that provides one or more enterprise application(s) 318 (or a suite of such applications) according to embodiments described herein. Such data 316 may also include enterprise-specific data that is independently maintained by the enterprise and then uploaded during the content customization process, as well as the content customization data that is generated according to embodiments described herein.

Those skilled in the art will appreciate that FIG. 3 describes software that acts as an intermediary between a user of the computing system 300 and the basic computing resources described with respect to the operating environment of the computing system 300. Such software includes an operating system 320, which is included as one of the enterprise applications 318 described herein. The operating system 320, which may be stored on the disk storage 312, acts to control and allocate the computing resources of the computing system 300. Moreover, additional enterprise application(s) 318, such as, for example, one or more web-based applications 322, one or more mobile applications 324, and/or one or more additional applications/services 326 provided by the application service provider, take advantage of the management of the computing resources by the operating system 320 through one or more program modules stored within a computer-readable storage medium (or media) 328, as described further herein.

The computing system 300 also includes an input/output (I/O) subsystem 330. The I/O subsystem 330 includes a set of hardware, software, and/or firmware components that enable or facilitate inter-communication between the user of the computing system 300 and the processor 302 of the computing system 300. During operation of the computing system 300, the I/O subsystem 330 enables the user to interact with the computing system 300 through one or more I/O devices 332. Such I/O devices 332 may include any number of input devices or channels, such as, for example, one or more touchscreen/haptic input devices, one or more buttons, one or more pointing devices, one or more accessories, one or more audio input devices, and/or one or more video input devices, such as a camera. Furthermore, in some embodiments the one or more input devices or channels connect to the processor 302 through the system bus 310 via one or more interface ports (not shown) integrated within the I/O subsystem 330. Such interface ports may include, for example, a serial port, a parallel port, a game port, and/or a universal serial bus (USB).

In addition, such I/O devices 332 may include any number of output devices or channels, such as, for example, one or more audio output devices, one or more haptic feedback devices, and/or one or more display devices. Such output devices or channels may use some of the same types of ports as the input devices or channels. Thus, for example, a USB port may be used to both provide input to the computing system 300 and to output information from the computing system 300 to a corresponding output device. Moreover, in some embodiments, the one or more output devices or channels are accessible via one or more adapters (not shown) integrated within the I/O subsystem 330.

In various embodiments, the computing system 300 is communicably coupled to any number of remote computing systems 334, such as remote computing systems that are operated by users (e.g., employees) who are associated with an enterprise that utilizes (or subscribes to) the enterprise application(s) 318. The remote computing system(s) 334 may include, for example, one or more personal computers, one or more servers, one or more routers, one or more network PCs, one or more workstations, one or more microprocessor-based appliances, one or more mobile phones, and/or one or more peer devices or other common network nodes. As an example, in some embodiments, the computing system 300 is an application service provider server hosting the enterprise application(s) 318 in a networked environment using logical connections to the remote computing systems 334. In such embodiments, the computing system 300 may provide for execution of the enterprise application(s) 318 on the remote computing systems 334 with the enhanced functionality provided by the enterprise-level application content customization techniques described herein.

In various embodiments, the remote computing systems 334 are logically connected to the computing system 300 through a network 336 and then connected via a communication connection 338, which may be wireless. The network 336 encompasses wireless communication networks, such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The communication connection 33 includes the hardware/software employed to connect the network 336 to the bus 310. While the communication connection 338 is shown for illustrative clarity as residing inside the computing system 300, it can also be external to the computing system 300. The hardware/software for connection to the network 336 may include, for example, internal and external technologies, such as mobile phone switches, modems including regular telephone grade modems, cable modems and DSL modems, ISDN adapters, and/or Ethernet cards.

As described above, system applications, such as the enterprise application(s) 318, take advantage of the management of the computing resources by the operating system 320 through one or more program modules stored within the computer-readable storage medium (or media) 328. In some embodiments, the computer-readable storage medium 328 is integral to the computing system 300, in which case it may form part of the memory 304 and/or the disk storage 312. In other embodiments, the computer-readable storage medium 328 is an external device that is connected to the computing system 300 when in use.

In various embodiments, the one or more program modules stored within the computer-readable storage medium 328 include program instructions or code that may be executed by the processor 302 to perform various operations. In various embodiments, such program modules include, but are not limited to, an enterprise-level application content customization module 340 that causes the processor 302 to perform operations that result in the execution of the enterprise-level application content customization techniques provided herein, as described with respect to the method 200 of FIG. 2, for example. In particular, in various embodiments, execution of the enterprise application(s) 318 in conjunction with the enterprise-level application content customization module 340 may result in the surfacing of enterprise-specific customized content natively and in real-time during the execution of the enterprise application(s) 318 on the remote computing systems 334.

It is to be understood that the block diagram of FIG. 3 is not intended to indicate that the computing system 300 is to include all of the components shown in FIG. 3. Rather, the computing system 300 can include fewer or additional components not illustrated in FIG. 3 (e.g., additional applications, additional modules, additional memory devices, additional network interfaces, etc.). Furthermore, any of the functionalities of the one or more program modules/submodules may be partially, or entirely, implemented in hardware and/or in the processor 302. For example, the functionality may be implemented with an application specific integrated circuit, in logic implemented in the processor 302, or in any other device.

Figure 4:
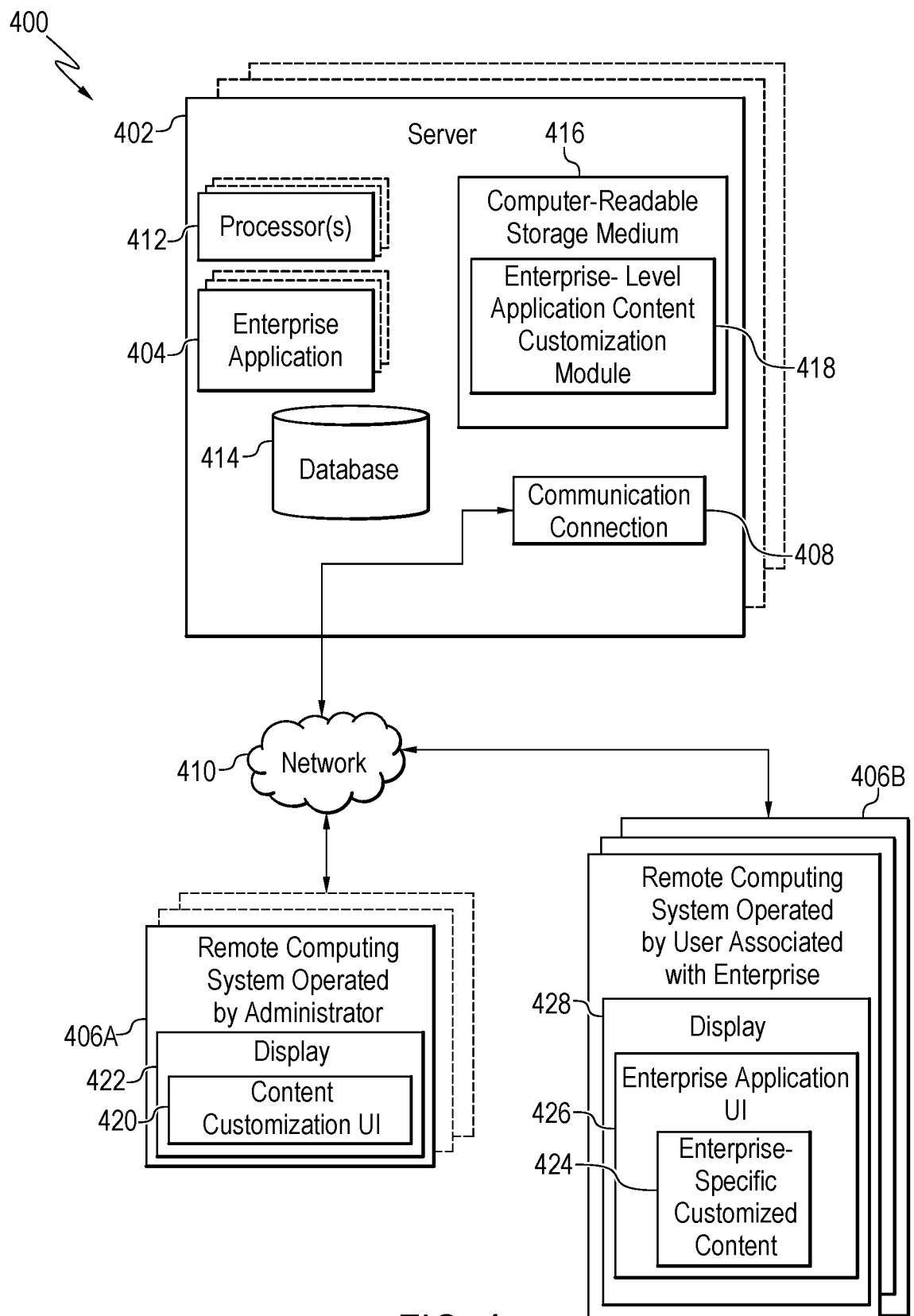
FIG. 4 is a block diagram of an exemplary network environment for implementing the enterprise-level application content customization techniques described herein.

FIG. 4 is a block diagram of an exemplary network environment 400 for implementing the enterprise-level application content customization techniques described herein. As shown in FIG. 4, the network environment 400 includes one or more server(s) 402 that provide for the execution of the techniques described herein. In various embodiments, the server(s) 402 are operated by an application service provider who provides for the execution of a suite of enterprise applications 404 for various enterprise customers. In addition, the network environment 400 may include any number of remote computing systems 406, including one or more remote computing systems 406A that are operated by administrators who are associated with a particular enterprise as well as multiple remote computing systems 406B that are operated by users (e.g., employees) who are associated with the enterprise.

In various embodiments, the server(s) 402 are configured to communicate with the remote computing system(s) 406 via a communication connection 408 and a corresponding network 410 (e.g., using one or more application programming interfaces (APIs) corresponding to the enterprise applications 404, for example). The network 410 may include, but is not limited to, a cellular network, a point-to-point dial up connection, a satellite network, the Internet, a local area network (LAN), a wide area network (WAN), and/or a Wi-Fi network. Such networks are widely used to connect various types of network elements, such as routers, servers, and gateways. Moreover, those skilled in the art will appreciate that the present techniques may also be practiced in a multi-network environment having various connected public and/or private networks. Furthermore, those skilled in the art will appreciate that communication networks can take several different forms and use several different communication protocols. For example, in some embodiments, the present techniques may be practiced in a distributed computing environment in which tasks are performed by remote processing devices that are linked through a communications network. In a distributed computing environment, program modules can be located in both local and remote computer-readable storage media.

In various embodiments, the server(s) 402 include one or more processors 412, as well as a database 414 that functions as a repository for the data that is generated and maintained according to embodiments described herein. Such data may include, but are not limited to, content customization data relating to generic, templatized content and/or personalized or branded content corresponding to the particular enterprise, as well as internal enterprise-specific data and/or telemetry (e.g., as stored with respect to one or more property graphs that are maintained by the application service provider) and/or external enterprise-specific data (e.g., as stored by the enterprise) that are utilized to generate the customized content. In addition, the server(s) 402 include a computer-readable storage medium 416 including an enterprise-level application content customization module 418 that directs the processor(s) 412 to generate and surface the enterprise-specific customized content described herein natively and in real-time during the execution of the enterprise applications 404 on the remote computing systems 406.

In some embodiments, the server(s) 402 maintains the code corresponding to the enterprise application 404. In such embodiments, the server(s) 402 may host the enterprise applications 404 on the remote computing system(s) 406 via the network 410 (e.g., using the corresponding APIs). In particular, the server(s) 402 provide for execution of the enterprise applications 404 on the remote computing system(s) 406A that are operated by the administrators associated with the enterprise by surfacing a content customization UI (or GUI) 420 on a display 422 corresponding to each remote computing system 406A. As described herein, user input received via the content customization UI 420 may then cause the enterprise-level application content customization module 418 to generate enterprise-specific customized content 424. Furthermore, the server(s) 402 also provide for execution of the enterprise applications 404 on the remote computing system(s) 406B that are operated by users (e.g., employees) associated with the enterprise by surfacing an enterprise application UI (or GUI) 426 on a display 428 corresponding to each remote computing system 406B. As described herein, the enterprise-specific customized content 424 may then be surfaced on the display 428 as part of the enterprise application UI 426 natively and in real-time based on the parameters that were input to the content customization UI 420. In this manner, the enterprise-level application content customization techniques described herein enable administrator(s) associated with an enterprise to fully customize employees' (or other users') experiences with respect to the suite of enterprise applications 404. Moreover, such customization is achieved seamlessly during the execution of the enterprise applications 404 without requiring the installation of any type of separate application or tool.

It is to be understood that the simplified block diagram of FIG. 4 is not intended to indicate that the network environment 400 is to include all of the components shown in FIG. 4. Rather, the network environment 400 may include different components and/or additional components not illustrated in FIG. 4. For example, in practice, the server(s) 402 will include a number of additional components not depicted in the simplified block diagram of FIG. 4, as described with respect to the computing system 300 of FIG. 3, for example.

Figure 5:
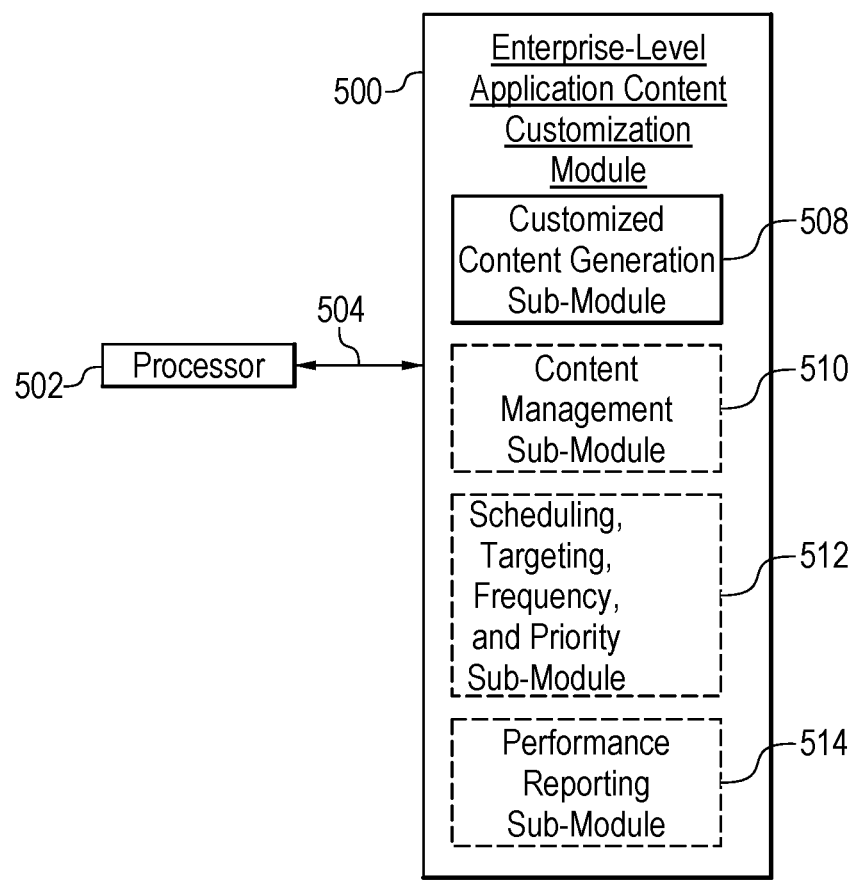
FIG. 5 is a block diagram of an exemplary computer-readable storage medium for implementing the enterprise-level application content customization techniques described herein.

FIG. 5 is a block diagram of an exemplary computer-readable storage medium 500 for implementing the enterprise-level application content customization techniques described herein. In various embodiments, the computer-readable storage medium 500 is accessed by a processor 502 over a computer interconnect 504. For example, in some embodiments, the computer-readable storage medium 500 is the same as, or similar to, the computer-readable storage medium described with respect to the computing system 300 of FIG. 3 and/or the network environment 400 of FIG. 4. Moreover, in various embodiments, the computer-readable storage medium 500 corresponds to the enterprise-level application content customization system 100 described with respect to FIG. 1, where such system 100 is implemented via one or more server(s) (e.g., one or more application service provider server(s) corresponding to the enterprise applications described herein).

In various embodiments, the computer-readable storage medium 500 includes code (i.e., computer-executable instructions) to direct the processor 502 to perform the operations of the present techniques. Such code may be stored within the computer-readable storage medium 500 in the form of program modules, where each module includes a set of computer-executable instructions that, when executed by the processor 502, cause the processor 502 to perform a corresponding set of operations. In particular, in various embodiments, the computer-readable storage medium 500 includes an enterprise-level application content customization module 506 that directs the processor 502 to perform the enterprise-level application content customization techniques described herein. Moreover, in various embodiments, the enterprise-level application content customization module 506 accomplishes this via one or more sub-modules. Such sub-modules may include a customized content generation sub-module 508, an optional content management sub-module 510, an optional scheduling, targeting, frequency, and priority sub-module 512, and an optional performance reporting sub-module 514, as described herein.

Moreover, those skilled in the art will appreciate that any suitable number of the modules shown in FIG. 5 may be included within the computer-readable storage medium 500. Furthermore, any number of additional modules/sub-modules not shown in FIG. 5 may be included within the computer-readable storage medium 500, depending on the details of the specific implementation.

In various embodiments, the present techniques provide cloud-controlled security during the delivery of sensitive enterprise-specific customized content through the use of a two-call pattern process that involves utilizing security tokens with automatic expiration times and a custom content delivery network (CDN) rule that adds another layer of security when accessing the enterprise customer content (i.e., the portion of the enterprise-specific customized content that is owned by the enterprise, rather than the application service provider). Specifically, the two-call pattern process includes a particular process flow, as well as corresponding infrastructure and tooling, for ensuring that the enterprise-specific customized content meets the compliance, security, and transparency expectations that enterprise customers demand. In particular, the application service provider must protect data corresponding to the enterprise-specific customized content in a different manner as compared to other types of data. The two-call pattern process described herein accomplishes this goal by ensuring that the data corresponding to the enterprise-specific customized content are stored in segregated cloud stores that can be distinguished by cloud services for delivery to the specified users (e.g., the enterprise employees or other enterprise-specific users designated by the targeting policy).

More specifically, according to the two-call pattern process, the first call to the cloud service is initiated by the client (e.g., the computing system operated by the enterprise administrator who authors/creates the customized content), and the cloud service selects the set of resource IDs corresponding to the customer content that is stored in the segregated cloud storage that correspond to messages designated for that client as deemed by the corresponding enterprise. This selection is performed via metadata obtained at authoring time from the client (e.g., as specified by user input from the administrator). This selection happens without the processing of the enterprise customer content. The cloud service also generates a security token with an expiry time. The second call consists of a content delivery network (CDN) edge server authenticating the content creation request prior to delivery, where such authentication is accomplished using tokens in a templatized URL. A JSON file containing a templatized JSON for each message authored by the enterprise administrator is then returned, but with placeholders for signals consisting of a call-back to the cloud service, and tokens that must be replaced. Once the JSON file is retrieved via the CDN uniform resource locator (URL), the clients (e.g., the remote computing systems operated by the users who are authorized to receive the customized content) will perform a series of string replacements, one per placeholder, to fully hydrate the content.

In various embodiments, the response in the first call consists of items that include a "params" object containing placeholders that are to be replaced in the CDN JSON pointed to by the templatized URL. Moreover, in the second call, the client must construct the CDN URL based on the templatized URL field and the resource ID fields corresponding to the customer content that is stored in the segregated cloud storage as selected in the first call. This includes obtaining the templatized URL to use from the items received in the first call. If multiple items with the templatized URL field are found, then the first templatized URL field may be used. The templatized URL in each item will point to the same segregated cloud storage.

The clients must accumulate the resource IDs and sort the IDs lexicographically to improve CDN cache performance. The clients must then generate an OData filter string and replace the {FILTER} placeholder in the templatized URL with the generated string. Furthermore, the templatized URL includes a security token that was generated with an expiry time in the first call to the cloud service which chose the resource IDs to serve to the client. The validity of the security token is cloud-controlled.

In various embodiments, the clients include the following headers in the HTTP Request: (1) Accept: application/json; odata=nometadata; and (2) x-ms-client-request-id: <generated string that identifies the request> The CDN then responds with a payload, where the "json" field contains the stringified data contract with the enterprise customer content payload rendered correctly except with placeholders. Moreover, in various embodiments, during the final creative construction of the customized content, the "json" items in the CDN Batch response contain the data contract payload rendered correctly except with placeholders.

In other words, as high-level overview, the two-call pattern process involves checking if the item in the batch is a CDN Pointer and following the CDN link to download the JSON file with text and image URL assets. String replacements are then performed for each key-value pair in the "params" object of the JSON file obtained from the first call. Generally speaking, this two-call pattern process provides two layers of security before the client is able to actually access the enterprise-specific customized content.

Figure 6A:
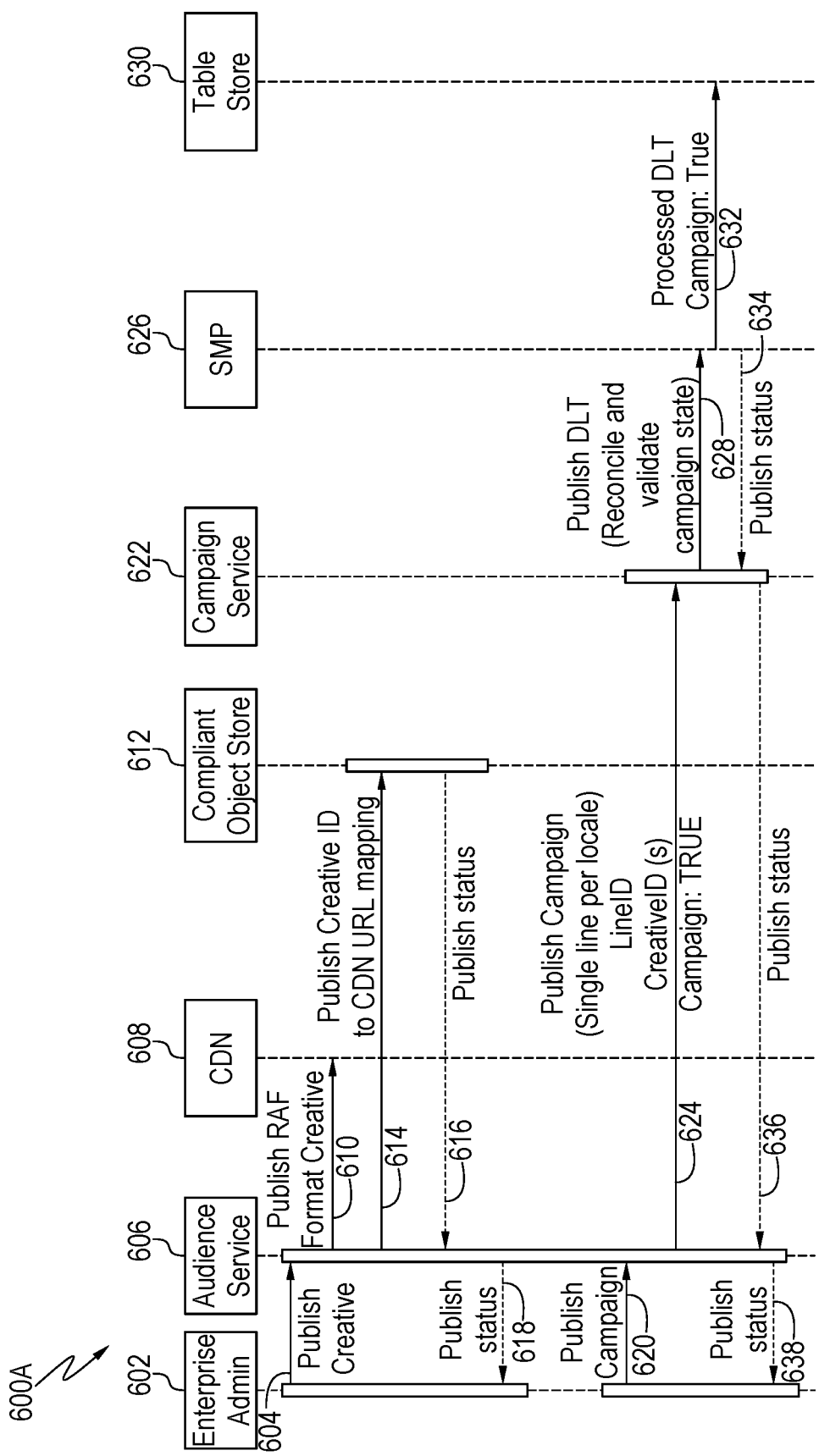
FIG. 6A is a process flow diagram showing an exemplary implementation of the two-call pattern process described herein during design time.

FIG. 6A is a process flow diagram showing an exemplary implementation of the two-call pattern process 600A during design time, i.e., when the enterprise administrator is creating the enterprise-specific customized content and setting parameters for the delivery of such content. As shown in FIG. 6A, during design time, the two-call pattern process 600A includes publishing the creative (i.e., the enterprise-specific customized content) via an Enterprise Administrator 602, as indicated by arrow 604. An Audience Service 606 then publishes the templatized JSON to the CDN 608, as indicated by arrow 610, and publishes the metadata about the authored content with a generated resource ID to a Compliant Object Store 612, as indicated by arrow 614. The metadata in the Compliant Object Store will be used by the client to fill in the placeholders in the templatized JSON that can only be known at the instant the cloud service receives the request after the first call of the two-call pattern. The Compliant Object Store 612 then publishes the status to the Audience Server 606, as indicated by arrow 616, which publishes the status to the Enterprise Administrator 602, as indicated by arrow 618.

The Enterprise Administrator 602 then publishes the campaign (i.e., the enterprise-specific customized content and the parameters for delivering such content) to the Audience Server 606, as indicated by arrow 620. The Audience Server 606 publishes the campaign (e.g., including a single line per locale, the LineID, CreativeID(s), and Campaign:True) to the Campaign Service 622 (which corresponds to the enterprise-level application content customization system provided by the application service provider), as indicated by arrow 624. The Campaign Service 622 publishes the DLT (with reconcile and validate campaign state) to an SMP 626, as indicated by arrow 628. The SMP 626 sends the processed DLT (e.g., including Campaign: True) to a Table Store 630, as indicated by arrow 632. The SMP 626 publishes the status to the Campaign Service 622, as indicated by arrow 634, which publishes the status to the Audience Service 606, as indicated by arrow 636. The Audience Service 606 then publishes the status to the Enterprise Administrator 602, as indicated by arrow 638.

Figure 6B:
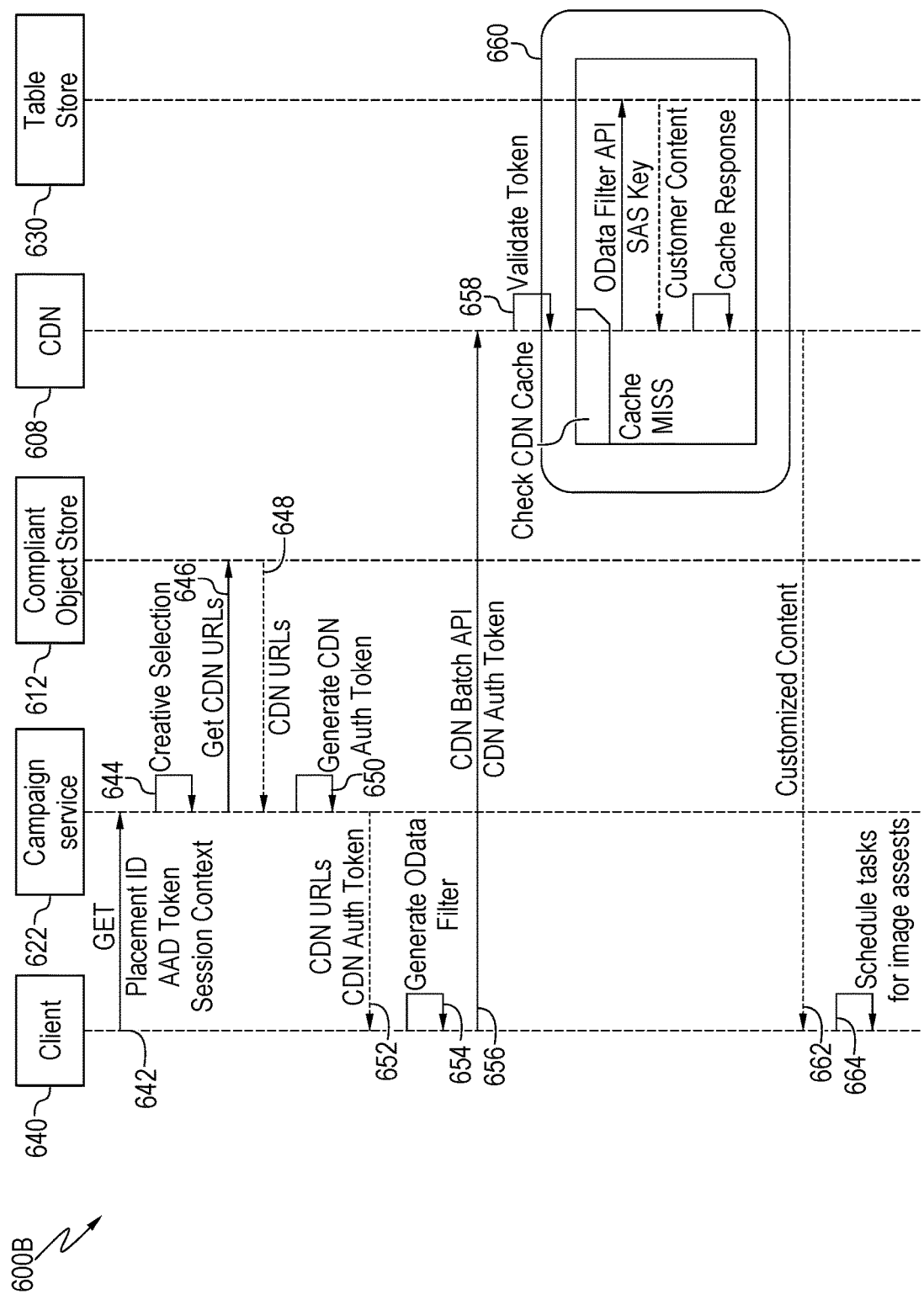
FIG. 6B is a process flow diagram showing an exemplary implementation of the two-call pattern process during run time.

FIG. 6B is a process flow diagram showing an exemplary implementation of the two-call pattern process 600B during run time, i.e., when the application content customization system is delivering the enterprise-specific customized content according to the specified parameters. As shown in FIG. 6B, the client 640 sends a GET Placement ID, AAD Token, and Session Context call to the Campaign Service 622, as indicated by arrow 642. The Campaign Service 622 then performs creative selection, as indicated by arrow 644, and sends a GET CDN URLs call to the Compliant Object Store 612, as indicated by arrow 646. The Compliant Object Store 612 returns the CDN URLs to the Campaign Service 622, as indicated by arrow 648, and the Campaign Service 622 then generates the CDN authorization token, as indicated by arrow 650.

After generating the CDN authorization token with a limited validity period, the Campaign Service 622 sends the token, along with the templatized URLs, to the client 640, as indicated by arrow 652, and the client 640 then generates the OData Filter, as indicated by arrow 654. Next, the client 640 sends the CDN batch API and the CDN authorization token to the CDN 608, as indicated by arrow 656, at which point the CDN 608 validates the token, as indicated by arrow 658. The process for validating the token according to the two-call pattern process 600B is depicted by box 660. The CDN is programmed with a custom rule that controls access to the customer content origin. The customer content origin contains the templatized JSON that has the enterprise customer content authored as described previously. The custom rule will append a Shared Access Signature (SAS) key in the call to the CDN origin (the source of truth) if token validation is successful. Both CDN security token and the CDN Origin SAS key independently protect the enterprise customer content and provide two layers of security to the enterprise customer content. Moreover, once the token has been validated and the origin validated the SAS key, the CDN 608 delivers the enterprise-specific customized content to the client 640, as indicated by arrow 662. The client 640 may then schedule tasks for Image assets, as indicated by arrow 664.

According to embodiments described herein, the enterprise-level application content customization system provides various management functions that enable the enterprise administrator who created the enterprise-specific customized content to dynamically modify such content and/or the parameters for delivering such content. For example, the enterprise-level application content customization system supports a cancel feature, a flush feature, a clone feature, a launch feature, and a re-launch feature (among others). Turning now to a description of the flush feature in particular, the flush feature enables the enterprise administrator to cause enterprise-specific content to be flushed and deleted from end user devices (i.e., the clients) on demand and in near-real-time by providing specific user input (e.g., a flush command) via the content customization UI. More specifically, the enterprise administrator can initiate a flush command via the content customization UI, causing the application service provider to send a "flush and delete" command to a wide group of client computing systems associated with the enterprise. In response to receiving that signal, the client computing systems remove/delete/ flush the previously-cached enterprise-specific customized content (e.g., images, strings/text, etc.) from the local cache of the client computing systems. Stated another way, selection of the flush command by the enterprise administrator causes the client computing systems to delete the corresponding customized content that were pre-fetched from the cloud services and that are also pre-associated with a particular UI that is renderable on the client computing systems. Furthermore, in some embodiments, the client computing systems may respond by making a secondary API call to request new content to be delivered from the cloud service. When such new content is received, the client computing systems may then immediately render received content within the particular UI. Accordingly, embodiments described herein enable enterprise administrators to immediately terminate outdated and/or erroneous campaigns by pushing commands, such as flush commands, to the client computing systems in near-real-time.

Figure 7:
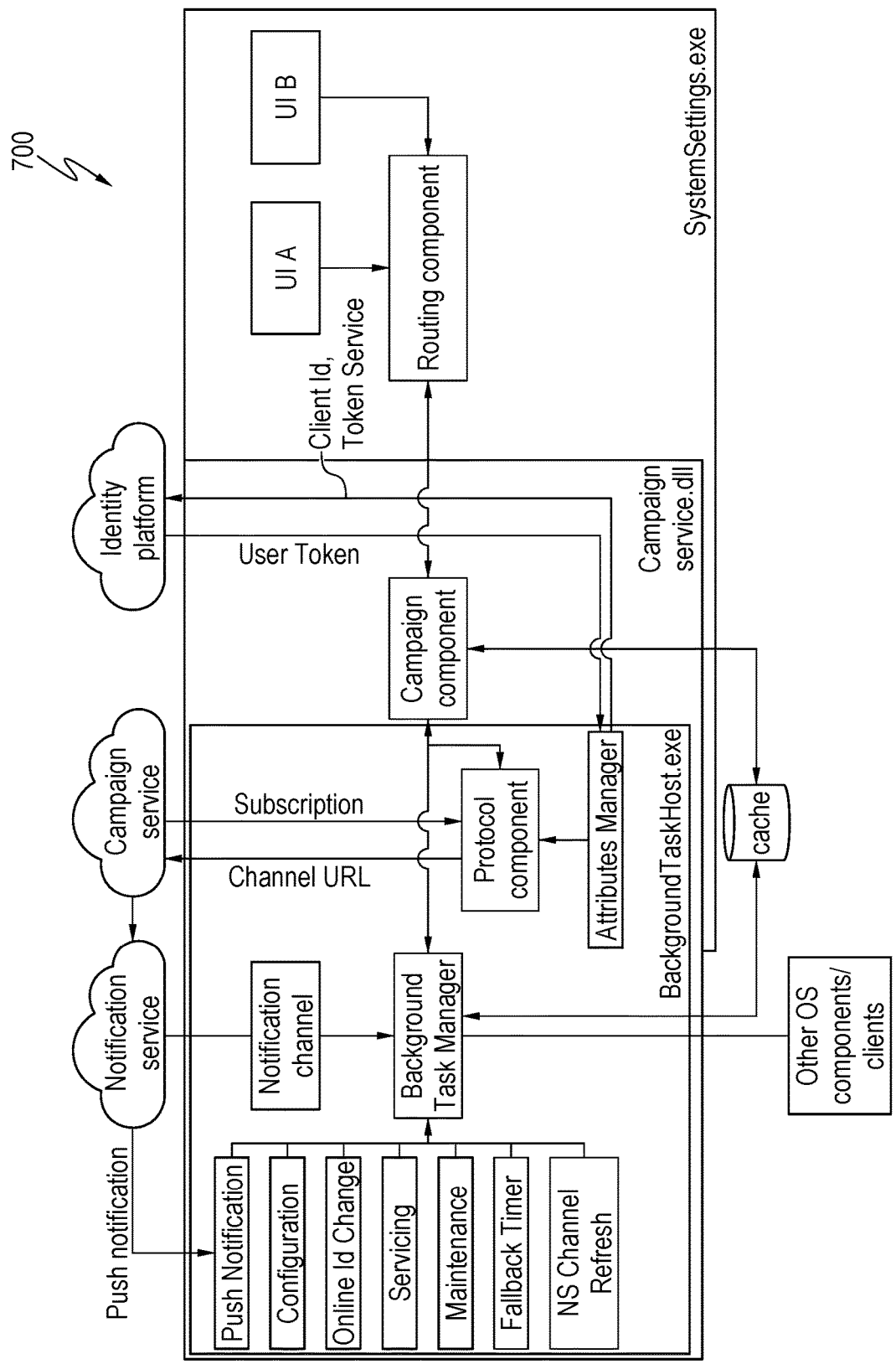
FIG. 7 is a simplified block diagram showing an architectural overview of the underlying push notification service (PNS) that enables the enterprise administrator to manage the delivery of the enterprise-specific customized content, including via the input of a flush command for flushing and deleting specific content from the client computing systems.

FIG. 7 is a simplified block diagram showing an architectural overview of the underlying push notification service (PNS) 700 that enables the enterprise administrator to manage the delivery of the enterprise-specific customized content, including via the input of a flush command for flushing and deleting specific content from the client computing systems. In various embodiments, the use of push notifications to keep the client computing systems in sync with the enterprise-level application content customization system provides near-real-time latency with minimal performance costs for retrieving and presenting data to the client.

In various embodiments, the background task for the push notification service 700 is the core piece of functionality that will manage all background activities to provide coordination with the content customization system. In some embodiments, a UWP background task infrastructure is used to perform activities such as registering a PNS channel and reacting to raw notifications as they arrive, setting and processing timers, and executing code at session connections. This enables push notifications to be received without requiring any persistent long-running code, thus enabling optimal performance costs for the system.

Figure 8A:
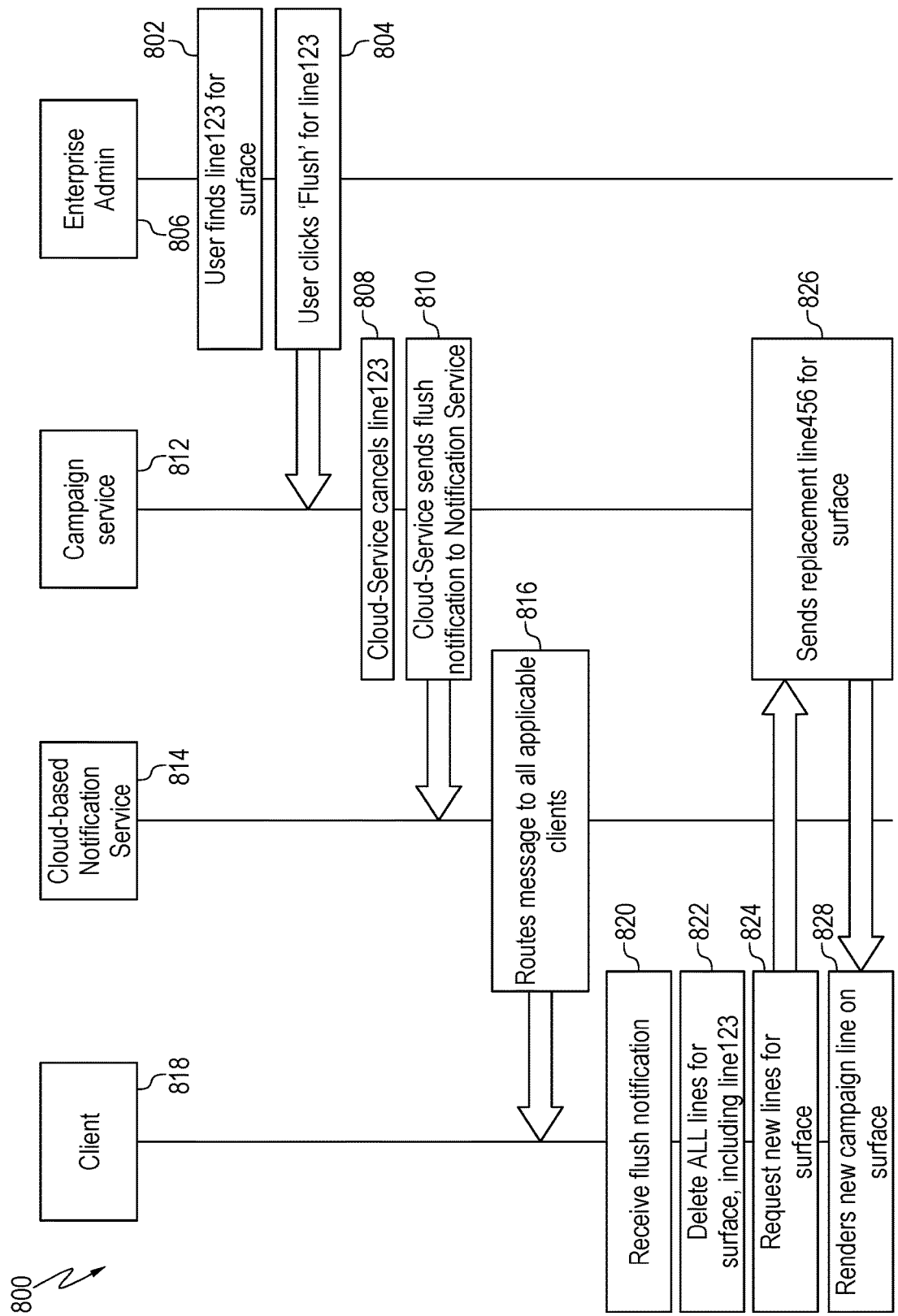
FIG. 8A is a process flow diagram showing an exemplary implementation of the flush and delete process described herein.

FIG. 8A is a process flow diagram showing an exemplary implementation of the flush and delete process 800 described herein. As indicated by boxes 802 and 804, the flush campaign begins with the enterprise administrator 806 finding "line123" for the client surface on the customized content management page of the content customization UI and clicking the flush command for "line123". As indicated by boxes 808 and 810, the Campaign Service 812 then cancels "line123" and sends a flush notification to the Cloud-based Notification Service 814. As indicated by box 816, the Cloud-based Notification Service 814 then routes the message to all applicable clients 818 (e.g., all remote computing systems operated by users who are associated with the particular enterprise and who were designated to receive the customized content).

As indicated by boxes 820 and 822, each applicable client 818 receives the flush notification and deletes all lines for the surfaces indicated, including "line123". As indicated by box 824, the client 818 may choose to send a request for new lines for all surfaces that are now lacking content to the Campaign Service 812, or the client can defer the content refresh to a later time. As indicated by box 826, the Campaign Service 812 responds by sending new selected content, e.g., "line456." Finally, as indicated by box 828, each client 818 renders the new campaign line when required based on the surface. In this manner, the flush and delete process 800 described herein enables the enterprise administrator to completely remove particular enterprise-specific customized content from the remote computing systems that were designated to receive such content, while also enabling such content to be replaced with other suitable content in near-real-time.

Figure 8B:
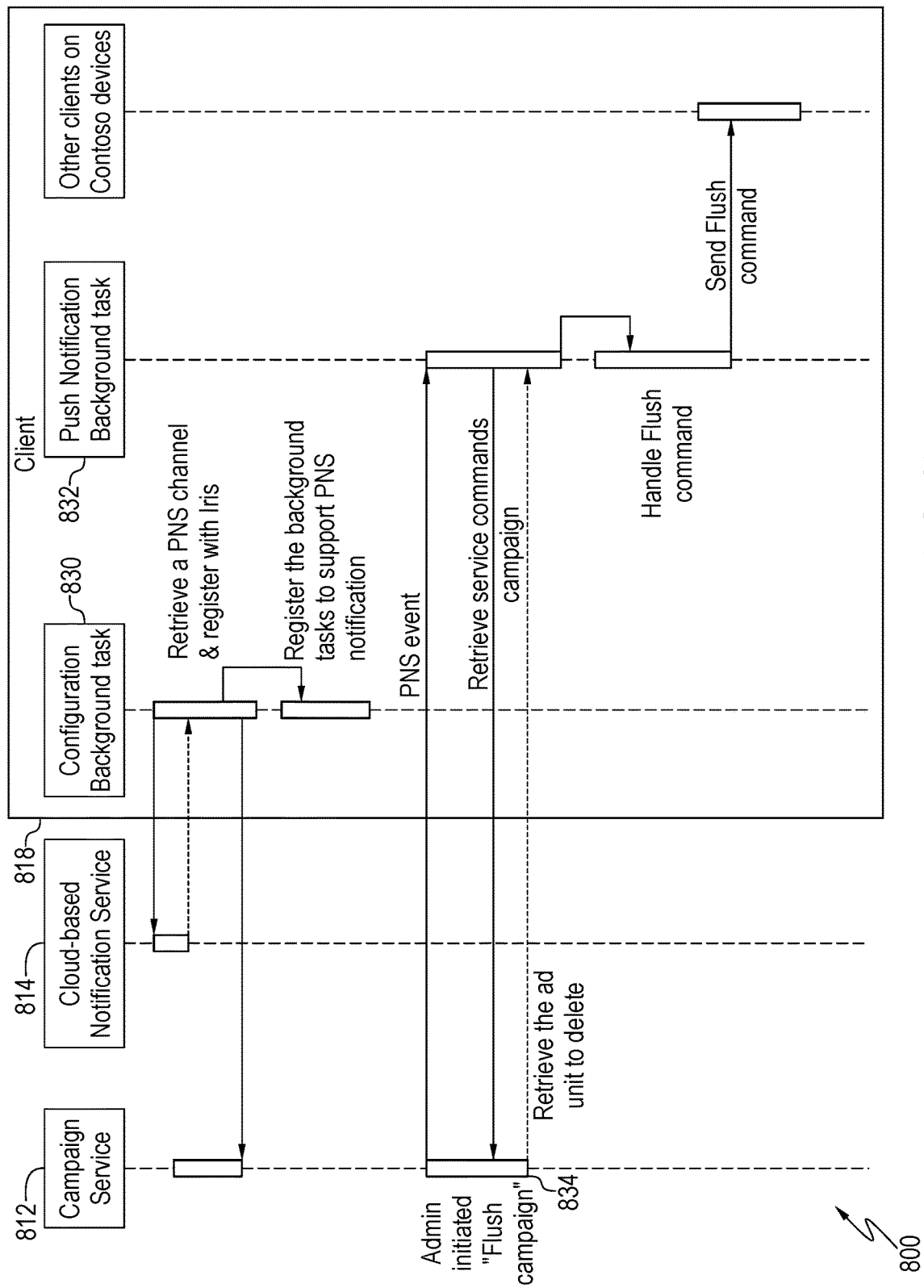
FIG. 8B is a process flow diagram showing an exemplary implementation of the flush and delete process from the perspective of the client.

FIG. 8B is a process flow diagram showing an exemplary implementation of the flush and delete process 800 from the perspective of the client 818. As shown in FIG. 8B, from the client's perspective, the flush and delete process 800 involves using both configuration and push notification background tasks 830 and 832, respectively, to handle the administrator-initiated flush campaign 834. In particular, multiple background task triggers are used, including PNS raw notifications, one or more scheduled timer(s) for refreshing the PNS channel, and a scheduled timer for a fallback pull. The action for most of these tasks is to analyze the prior state and take an appropriate action, including enabling additional triggers (e.g. a new timer in the back off scenarios). Moreover, the background trigger runtime classes will be very shallow, and the individual classes will simply log the background task activation reasoning and then immediately defer all work to a central background task manager component, while providing the activation reasoning. This will also enable unit testing of all the activations to correctly drive the state machine for entirely offline testing with very high coverage.

In various embodiments, the push and delete process described herein involves using a PNS management component to manage and abstract all communication with the Notification Platform. For example, the following may be utilized to retrieve the PNS channel: "PushNotification-ChannelManager::CreatePushNotificationChannelForApplicationAsy nc( ) The channel may then be registered with the content customization system.

In various embodiments, when the PNS channel is retrieved, the channel expiration time is also received. Therefore, a timer task may be set up to refresh the PNS channel before the channel expires. In some examples, the default channel expiration date is 30 days, although the channel expiration date may vary depending on the details of the particular implementation. Furthermore, in some embodiments, if communication with the PNS channel fails, a retry mechanism (e.g., 15 min, 1 hour, 4 hours, 24 hours, etc.) may be used to retry communication.

In various embodiments, a fallback timer is used to address lost notifications. In some examples, the default fallback timer interval is 24 hours, although the fallback timer interval may vary depending on the details of the particular implementation. In addition, such fallback timer interval is overridable by the content customization system.

In various embodiments, a state management functionality is also provided. The state management functionality includes a simple state machine that reads in the previous state and takes an action based on the trigger (e.g., PNS, timer, login, etc.). The state will contain information about the PNS channel (e.g., when to refresh, last successful refresh, number of attempts to refresh, etc.), registration (e.g., the last time the channel was registered and the number of attempts) and commands (e.g., the last date a command was received, the number of attempts to retrieve commands in case of error, the next date to pull commands, etc.). Furthermore, injection of test objects may be used to allow all inputs to this object to be unit tested with a goal of near 100% coverage of states.

Regarding notifications handling within the background task context, a pull for system action creatives may be performed. The system action creative will contain, at minimum, the surface ad unit and the command.

In this case the command will be a flush command. The caches corresponding to the ad unit specified in the creative may be searched, and all the cache nodes corresponding to the particular content will be deleted.

The following is a description of several exemplary implementations of the enterprise-level application content customization techniques described herein for particular use-case scenarios. Those skilled in the art will appreciate that these exemplary implementations are for illustrative purposes only. In practice, the techniques described herein may be implemented in any other suitable manner to achieve any other suitable results, depending on the details of the particular implementation.

Figure 9A:
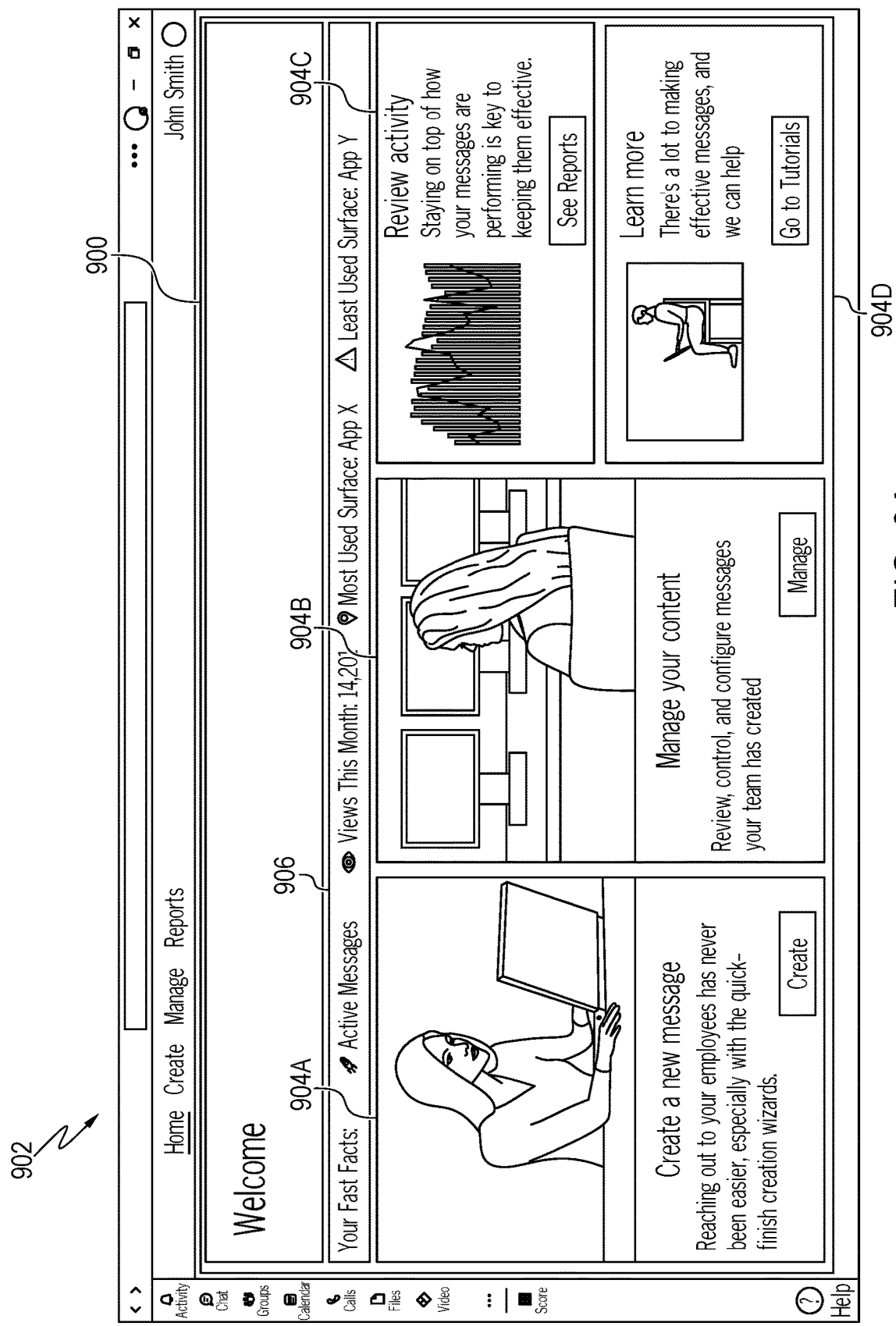
FIG. 9A is a schematic view showing an exemplary implementation in which a homepage of a content customization UI is surfaced with respect to an employee engagement feature of an enterprise application.

FIG. 9A is a schematic view showing an exemplary implementation in which a homepage 900 of a content customization UI 902 is surfaced with respect to an employee engagement feature of an enterprise application, such as, for example, an employee experience application (e.g., Microsoft® Viva®). According to the embodiment shown in FIG. 1, the homepage 900 of the content customization UI 902 includes a number of UI elements 904 relating to the generation of enterprise-specific customized content within the context of the suite of enterprise applications. In particular, the homepage 900 of the content customization UI 902 includes a customized content creation UI element 904A, a customized content management UI element 904B, a performance reporting UI element 904C, and an informational UI element 904D to enable the administrator to select one or more content customization tasks to be performed. In addition, according to the embodiment shown in FIG. 1, a "Fast Facts" bar 906 is surfaced on the homepage 900 of the content customization UI 902 to enable the administrator to quickly and efficiently view activity relating to previously-generated customized content and/or the corresponding enterprise applications.

Figure 9B:
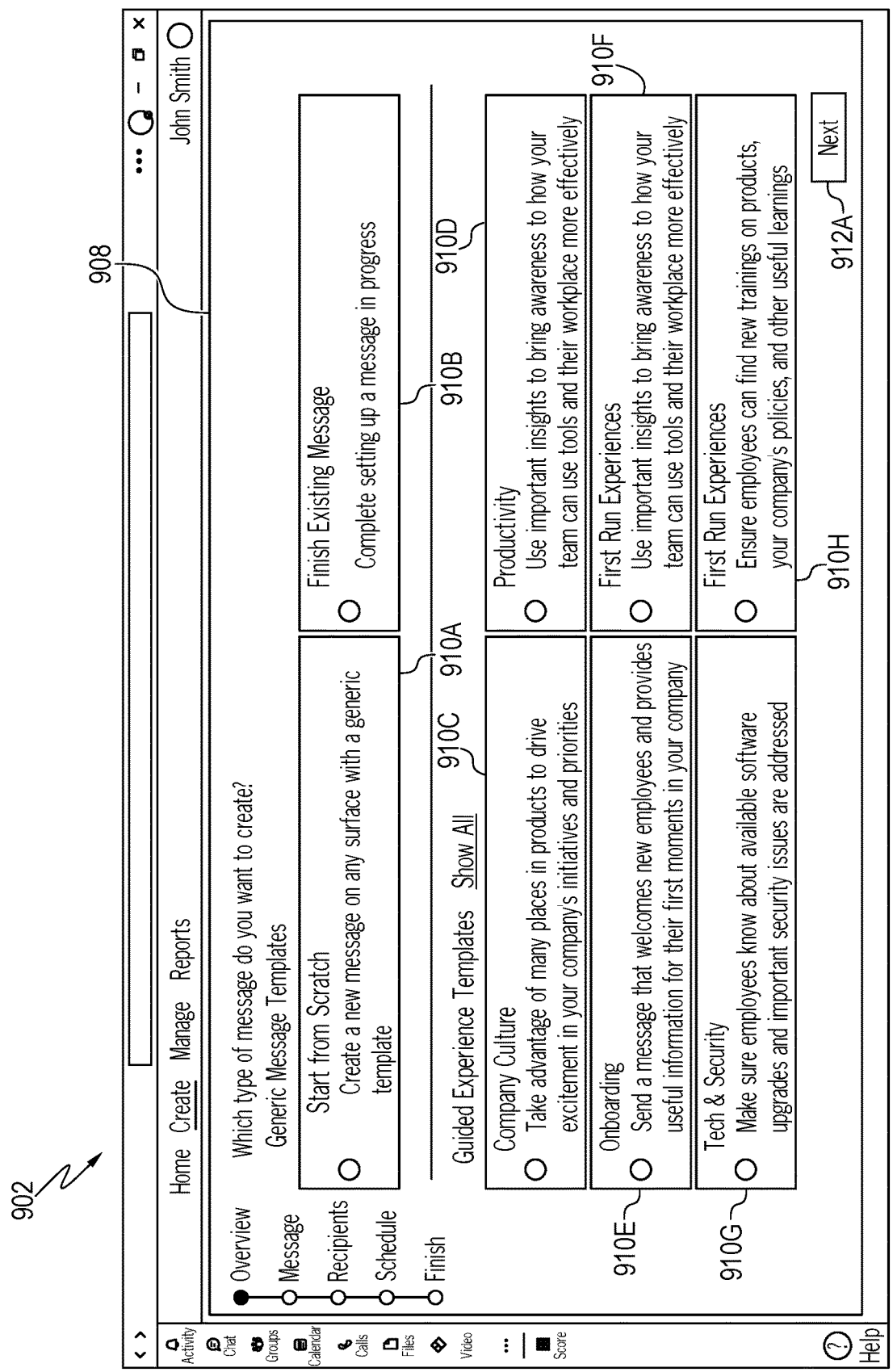
FIG. 9B is a schematic view showing an exemplary implementation in which a first customized content creation page of the content customization UI of FIG. 9A is surfaced with respect to the employee engagement feature of the enterprise application.

FIG. 9B is a schematic view showing an exemplary implementation in which a first customized content creation page 908 of the content customization UI 902 of FIG. 9A is surfaced with respect to the employee engagement feature of the enterprise application. In various embodiments, the first customized content creation page 908 is surfaced in response to user input including a selection of the customized content creation UI element 904A of FIG. 9A.

As shown in FIG. 9B, the first customized content creation page 908 of the content creation UI element 904A includes a number of UI elements 910 that enable the administrator to specify parameters for creating enterprise-specific customized content that is to be generated and surfaced during the execution of the enterprise applications (or some subset thereof). In particular, the first customized content creation page 908 includes several UI elements relating to generic message templates for creating customized content, including a "Start from Scratch" UI element 910A and a "Finish Existing Message" UI element 910B, as well as a number of UI elements relating to guided experience templates for creating customized content, including a "Company Culture" UI element 910C, a "Productivity" UI element 910D, an "Onboarding" UI Element 910E, a "First Run Experiences" UI element 910F, a "Tech & Security" UI element 910G, and a "Training" UI element 910H, for example. In addition, the first customized content creation page 908 includes a "Next" UI element (or button) 912A to enable the administrator to click to the next page once a template selection has been made.

Figure 9C:
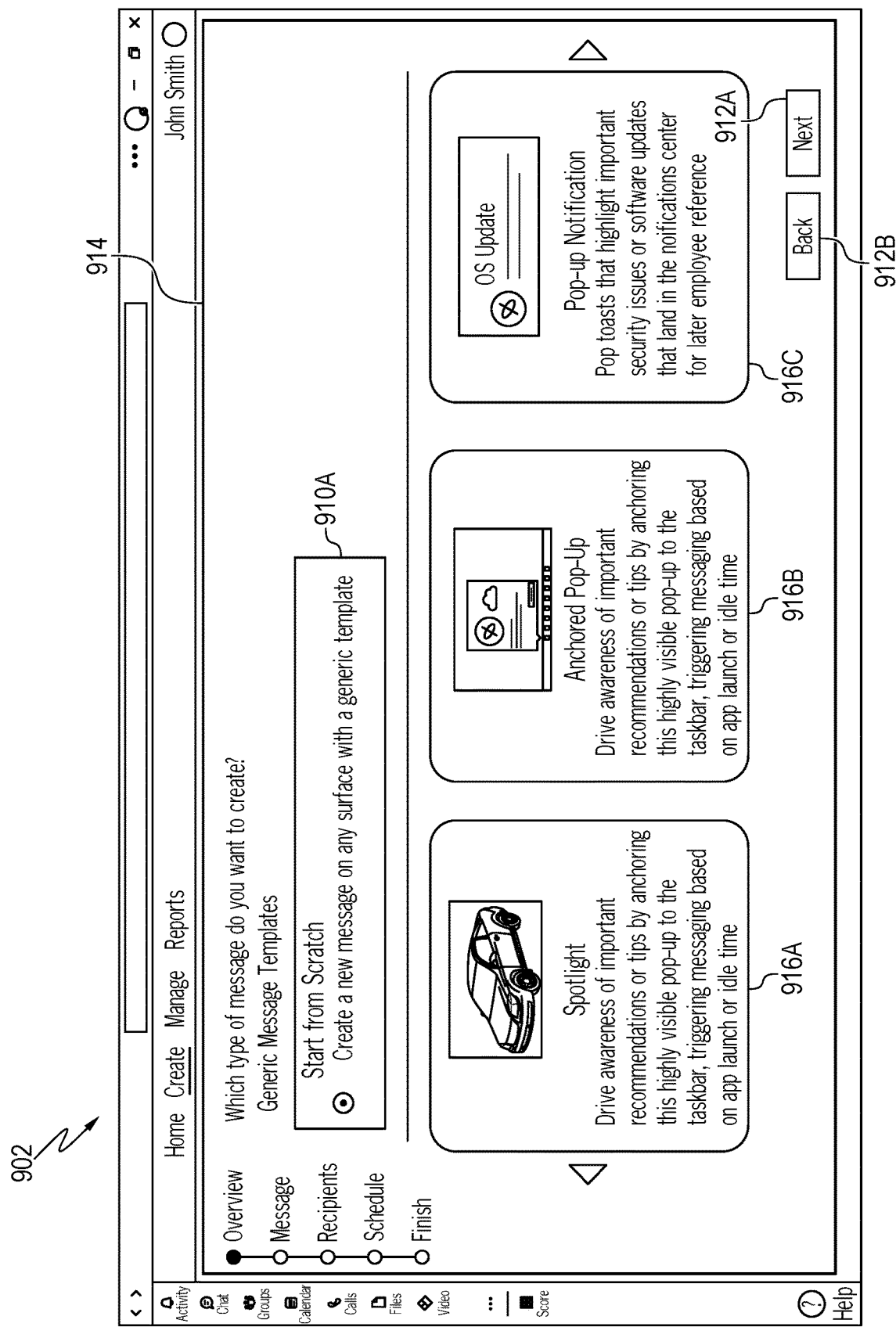
FIG. 9C is a schematic view showing an exemplary implementation in which a second customized content creation page of the content customization UI of FIGS. 9A and 9B is surfaced with respect to the employee engagement feature of the enterprise application.

FIG. 9C is a schematic view showing an exemplary implementation in which a second customized content creation page 914 of the content customization UI 902 of FIGS. 9A and 9B is surfaced with respect to the employee engagement feature of the enterprise application. According to the embodiment shown in FIG. 9C, the second customized content creation page 914 is surfaced in response to user input including a selection of the "Start from Scratch" UI element 910A of FIG. 9B. The second customized content creation page 914 includes a number of UI elements 916 that enable the administrator to select one or more form factors for surfacing the enterprise-specific customized content on the display devices of remote computing systems. Such UI elements include, for example, a "Spotlight" UI element 916A, an "Anchored Pop-Up" UI element 916B, and a "Pop-Up Notification" UI element 916C. Moreover, arrow buttons 918A and 918B are provided to enable the administrator to scroll through additional form factor options. In addition, the second customized content creation page 914 includes "Next" and "Back" UI elements (or buttons) 912A and 912B, respectively, to enable the administrator to click to the next page (or back to the previous page) once one or more form factor selections have been made.

Figure 9D:
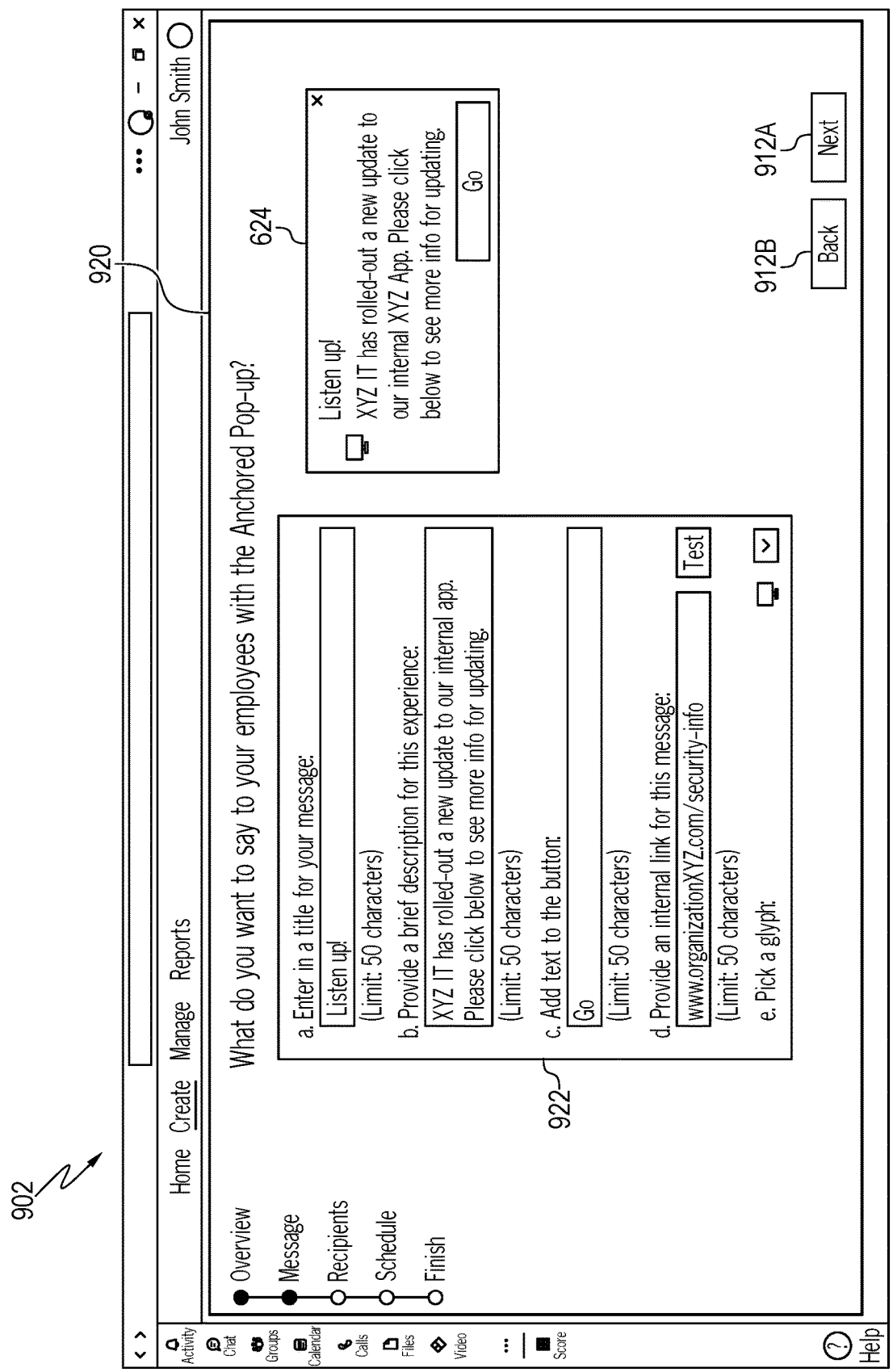
FIG. 9D is a schematic view showing an exemplary implementation in which a third customized content creation page of the content customization UI of FIGS. 9A-C is surfaced with respect to the employee engagement feature of the enterprise application.

FIG. 9D is a schematic view showing an exemplary implementation in which a third customized content creation page 920 of the content customization UI 902 of FIGS. 9A-C is surfaced with respect to the employee engagement feature of the enterprise application. According to the embodiment shown in FIG. 9D, the third customized content creation page 920 is surfaced in response to user input including a selection of the "Anchored Pop-Up" UI element 916B of FIG. 9C. The third customized content creation page 920 includes a content information UI element 922 that enables the administrator to input specific information to be provided within the customized content, as well as a content example UI element 924 that presents an exemplary view of how the customized content will appear once it has been generated.

Figure 9E:
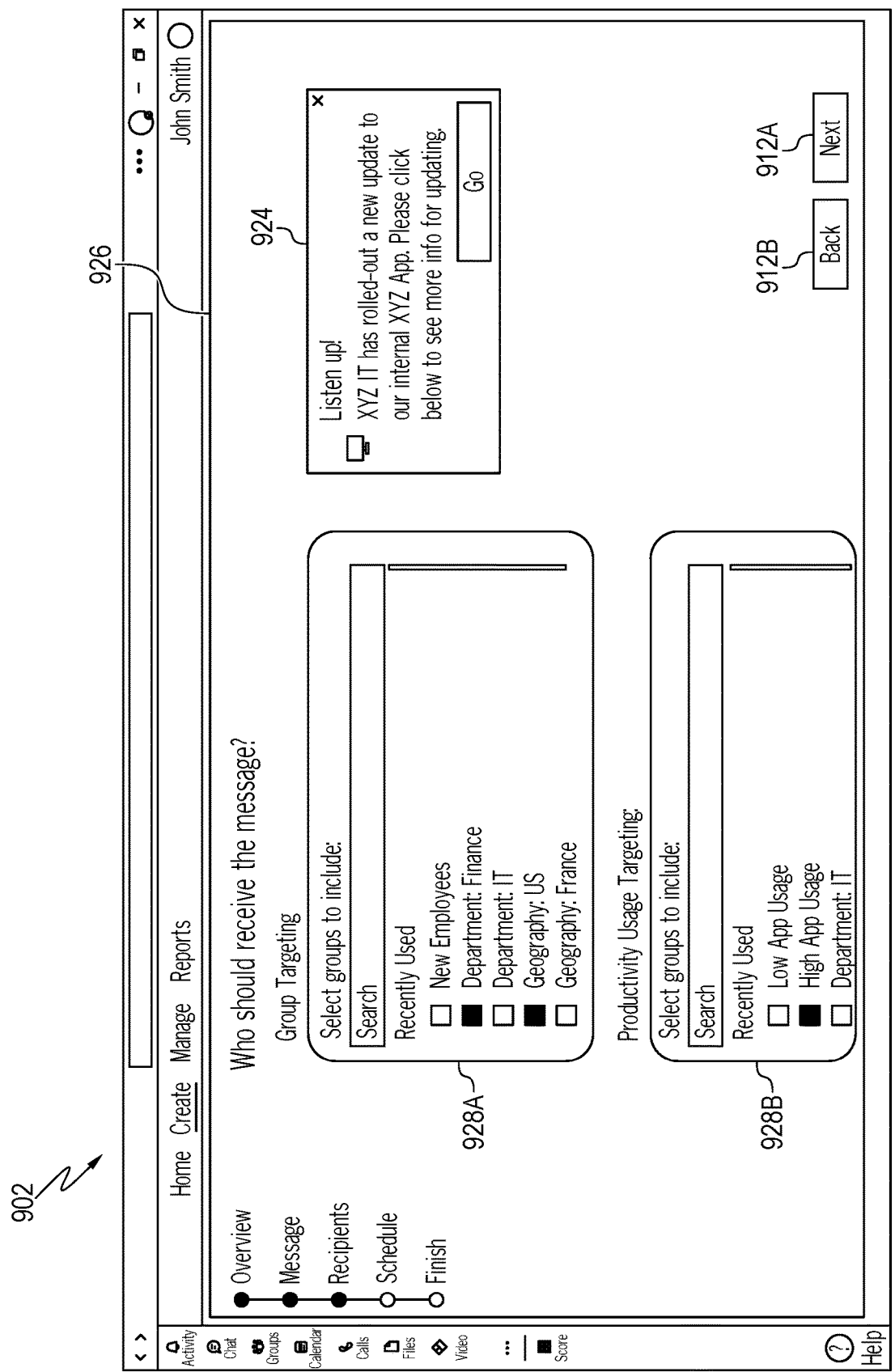
FIG. 9E is a schematic view showing an exemplary implementation in which a customized content targeting page of the content customization UI of FIGS. 9A-D is surfaced with respect to the employee engagement feature of the enterprise application.

FIG. 9E is a schematic view showing an exemplary implementation in which a customized content targeting page 926 of the content customization UI 902 of FIGS. 9A-D is surfaced with respect to the employee engagement feature of the enterprise application. According to the embodiment shown in FIG. 9E, the customized content targeting page 926 includes several UI elements 928 relating to a targeting policy for the customized content. Such UI elements include, for example, a group targeting UI element 928A for selecting users to be targeted based on specific employee types, departments, geographic groups, or other identifiable categories, as well as a productivity usage targeting UI element 928B for selecting specific users to be targeted based on application usage (e.g., high or low usage) and/or other similar metrics.

Figure 9F:
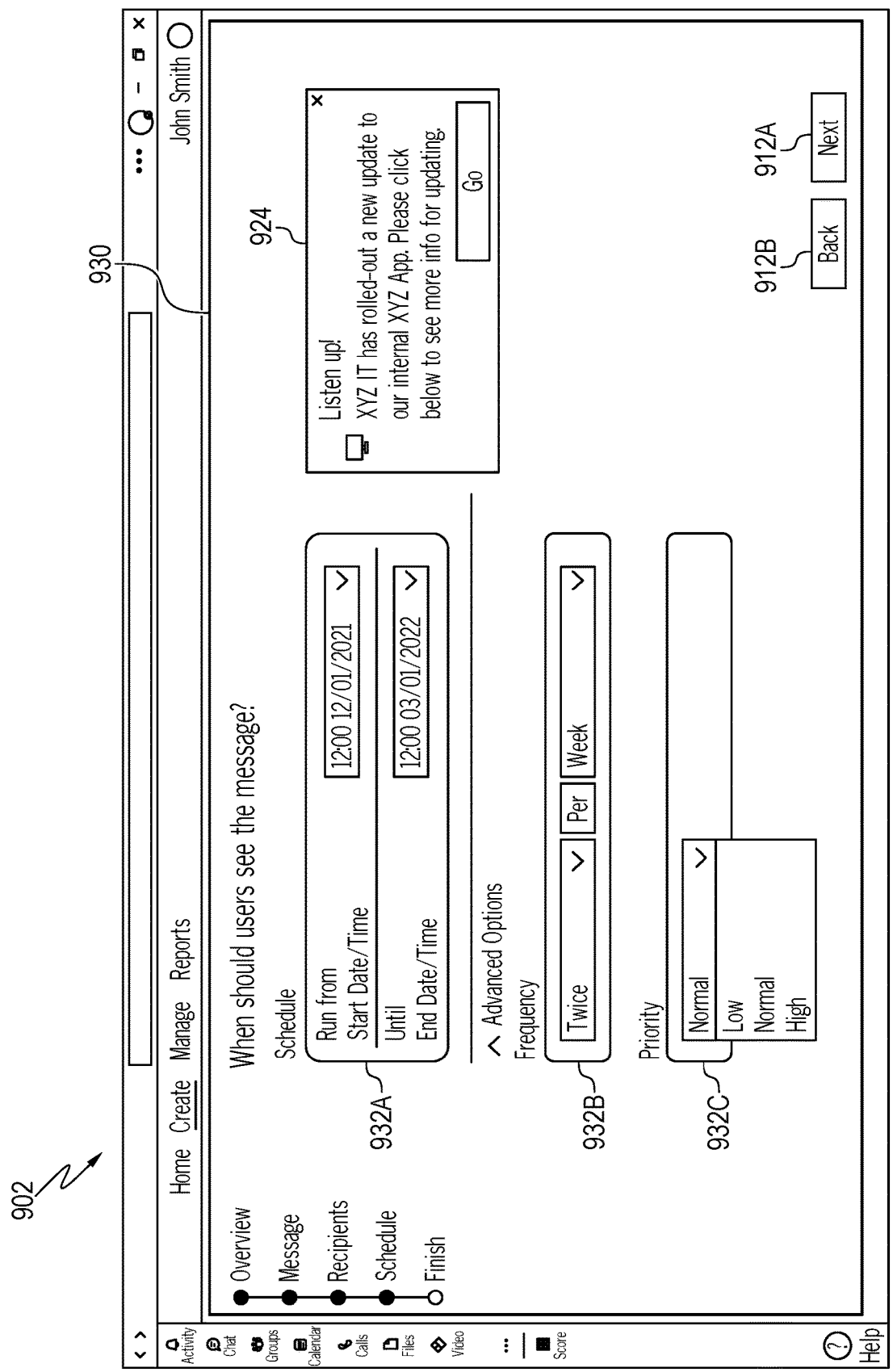
FIG. 9F is a schematic view showing an exemplary implementation in which a customized content scheduling page of the content customization UI of FIGS. 9A-E is surfaced with respect to the employee engagement feature of the enterprise application.

FIG. 9F is a schematic view showing an exemplary implementation in which a customized content scheduling page 930 of the content customization UI 902 of FIGS. 9A-E is surfaced with respect to the employee engagement feature of the enterprise application. According to the exemplary embodiment shown in FIG. 9F, the customized content scheduling page 930 includes, for example, a scheduling UI element 932A for specifying the date range for providing the customized content (e.g., start date to end date), a frequency UI element 932B for specifying the frequency for providing the customized content (e.g., once per week, twice per week, once per month, twice month, etc.), and a priority UI element 932C for specifying the priority for providing the customized content (e.g., low priority, normal priority, or high priority).

Figure 9G:
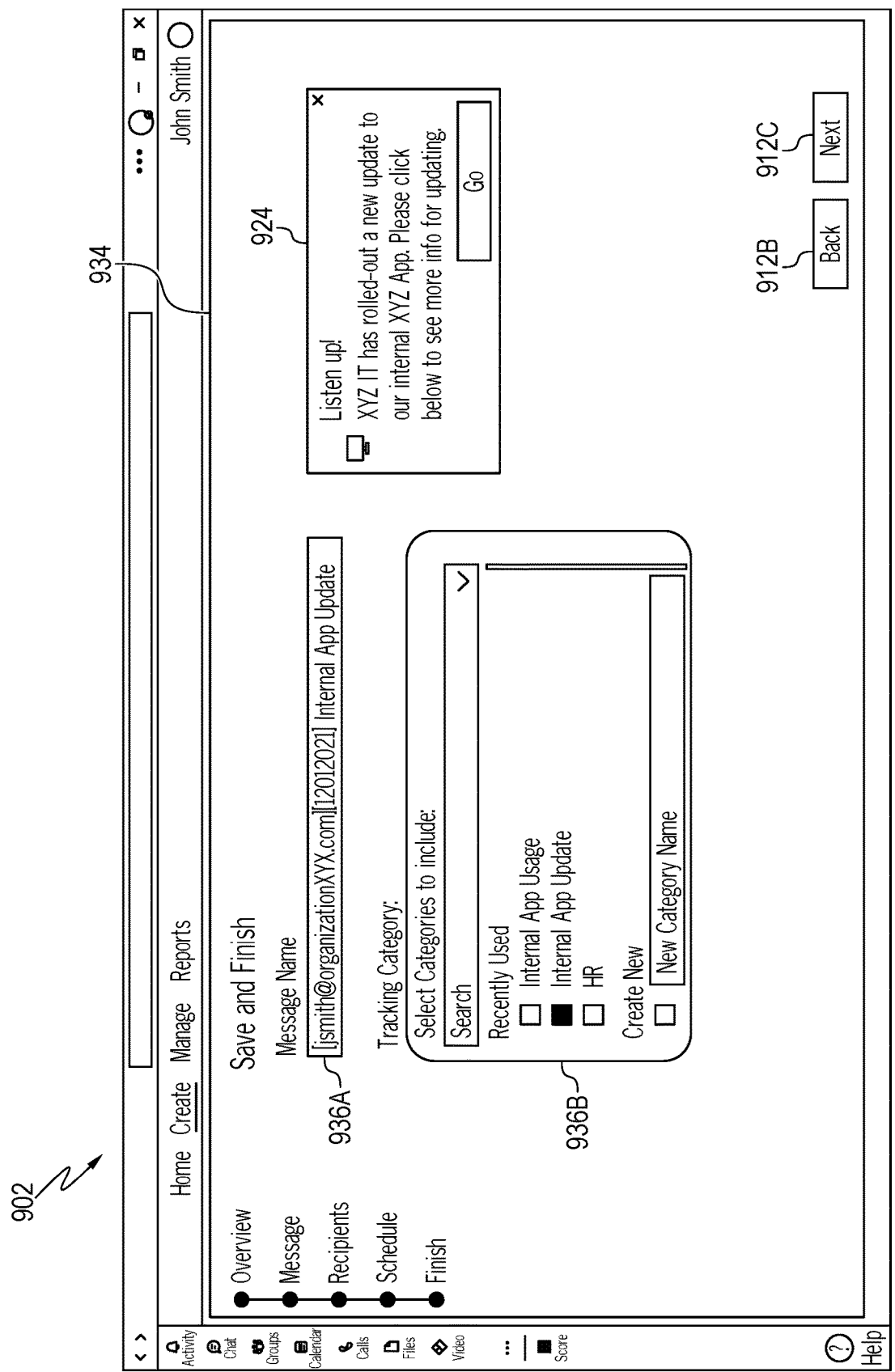
FIG. 9G is a schematic view showing an exemplary implementation in which a customized content completion page of the content customization UI of FIGS. 9A-F is surfaced with respect to the employee engagement feature of the enterprise application.

FIG. 9G is a schematic view showing an exemplary implementation in which a customized content completion page 934 of the content customization UI 902 of FIGS. 9A-F is surfaced with respect to the employee engagement feature of the enterprise application. In various embodiments, the customized content completion page 934 includes UI elements for saving and completing the creation of the enterprise-specific customized content. In particular, a "Message Name" UI element 936A enables the administrator to create a name for the customized content so that the saved content can be easily retrieved and modified in the future. In addition, a "Tracking Category" UI element 936B enables the administrator to specify parameters for collecting performance data relating to the customized content. Moreover, the customized content completion page 934 includes a "Finish" UI element (or button) 912C that enables the administrator to save and complete the customized content. In various embodiments, upon clicking on the "Finish" UI element 912C, the content customization UI 902 may resurface the homepage 908.

Figure 9H:
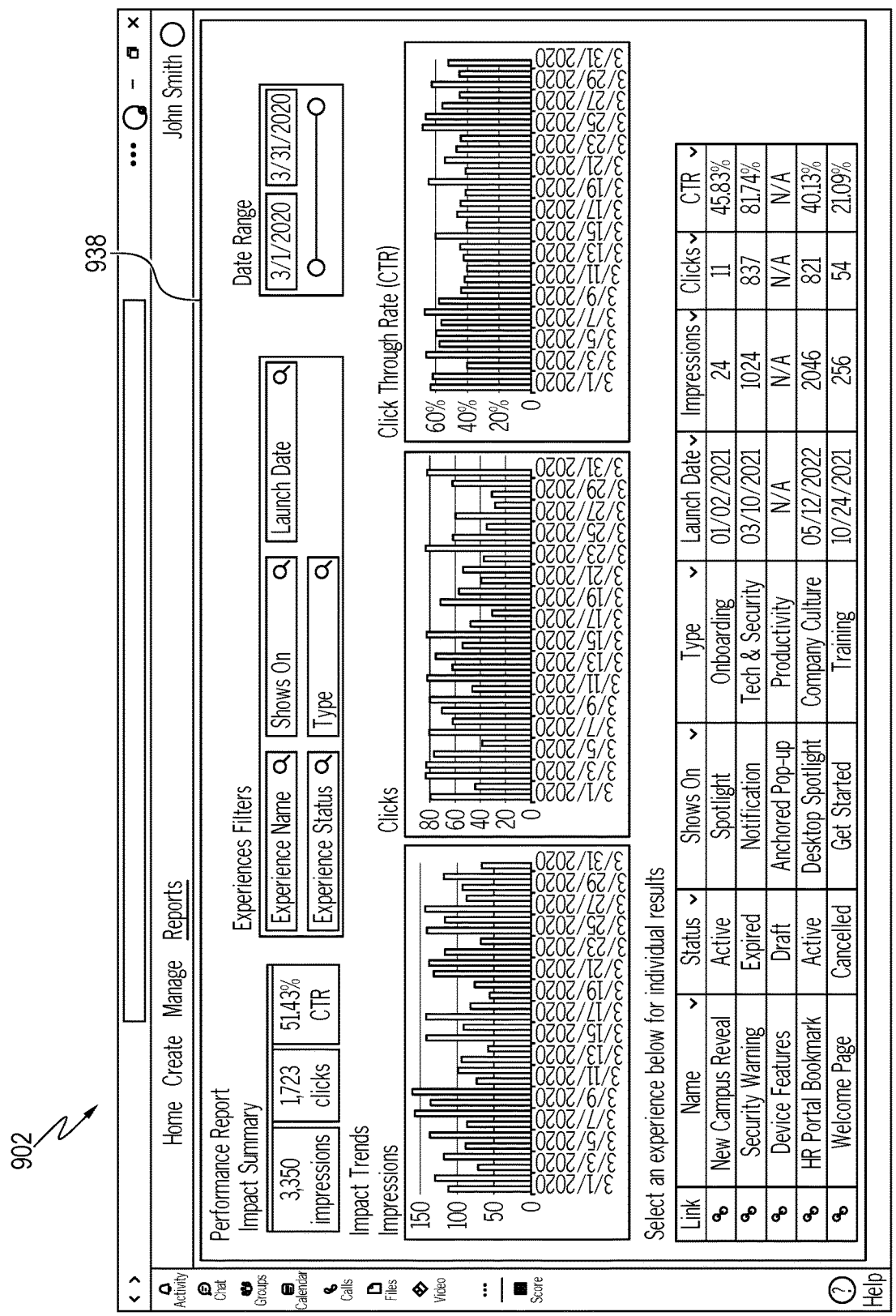
FIG. 9H is a schematic view showing an exemplary implementation in which a performance reporting page of the content customization UI of FIGS. 9A-G is surfaced with respect to the employee engagement feature of the enterprise application.

FIG. 9H is a schematic view showing an exemplary implementation in which a performance reporting page 938 of the content customization UI 902 of FIGS. 9A-H is surfaced with respect to the employee engagement feature of the enterprise application. In various embodiments, the performance reporting page 938 is surfaced in response to user input including a selection of the performance reporting UI element 904C of FIG. 9A. As shown in FIG. 9H, the performance reporting page 938 surfaces a graphical representation of a performance report for the customized content, which is generated using the performance data that is tracked in response to the surfacing of the customized content on the display devices of the remote computing systems.

Figure 9I:
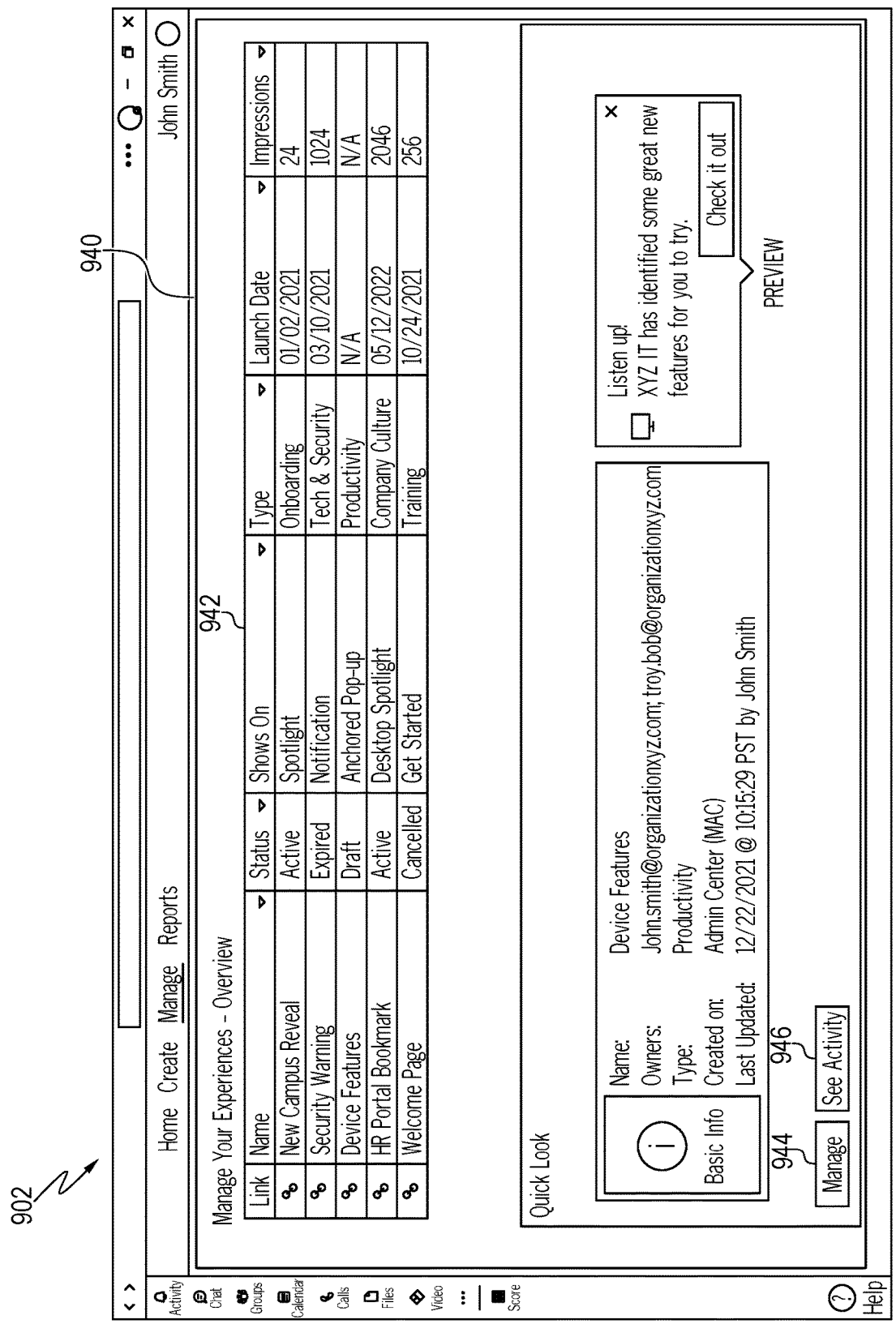
FIG. 9I is a schematic view showing an exemplary implementation in which a first customized content management page of the content customization UI of FIGS. 9A-H is surfaced with respect to the employee engagement feature of the enterprise application.

FIG. 9I is a schematic view showing an exemplary implementation in which a first customized content management page 940 of the content customization UI 902 of FIGS. 9A-H is surfaced with respect to the employee engagement feature of the enterprise application. In some embodiments, the administrator may open the first customized content management page 940 after reviewing the performance data presented by the performance reporting page 938 of FIG. 9H. According to the embodiment shown in FIG. 9I, the first customized content management page 940 includes an overview section 942 that displays information relating to currently-generated enterprise-specific customized content, as well as a "Manage" UI element 944 that enables the administrator to perform management functions related to such content and a "See Activity" UI element 946 that enables the administrator to view more detailed activity relating to the content.

Figure 9J:
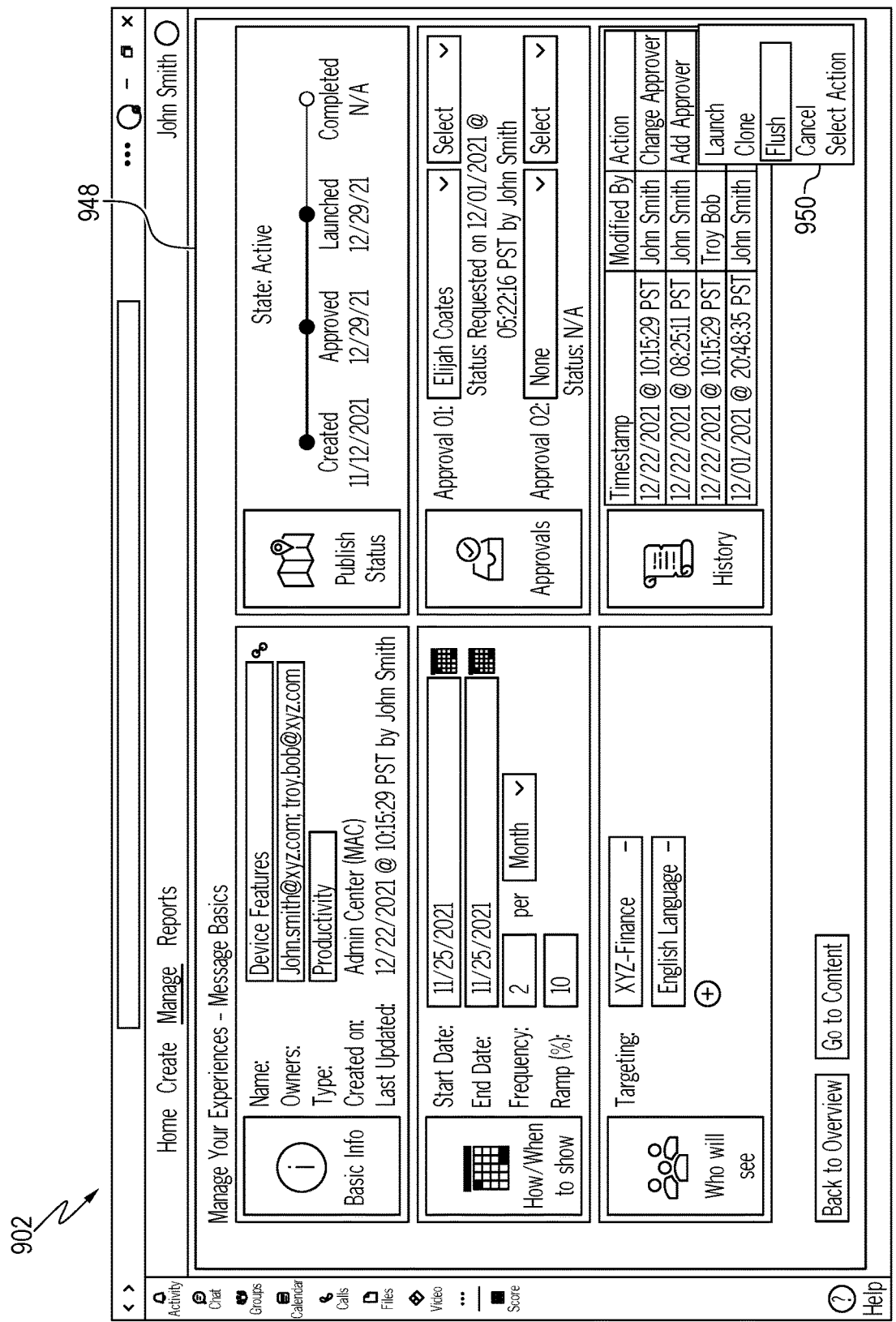
FIG. 9J is a schematic view showing an exemplary implementation in which a second customized content management page of the content customization UI of FIGS. 9A-I is surfaced with respect to the employee engagement feature of the enterprise application.

FIG. 9J is a schematic view showing an exemplary implementation in which a second customized content management page 948 of the content customization UI 902 of FIGS. 9A-I is surfaced with respect to the employee engagement feature of the enterprise application. According to the embodiment shown in FIG. 9J, the second customized content management page 948 is surfaced in response to user input including a selection of the "Manage" UI element 944 of FIG. 9I. The second customized content management page 948 includes various UI elements relating to managing the enterprise-specific customized content, including, in particular, a drop-down menu 950 that enables the administrator to select one or more management actions, including a launch command for launching the customized content, a clone command for cloning the customized content, and a flush command for flushing and deleting the customized content according to the flush and delete process described herein.

Figure 10:
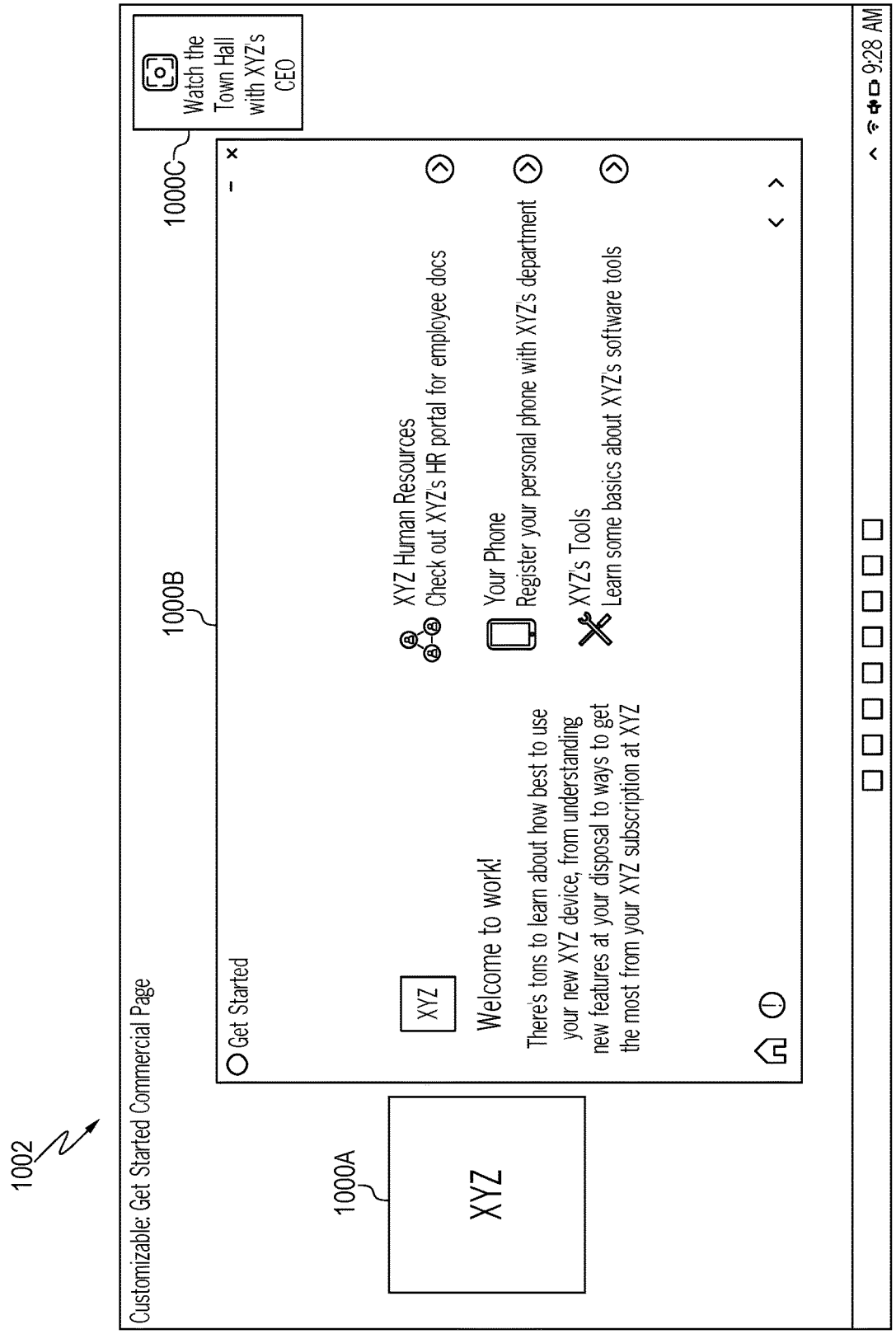
FIG. 10 is a schematic view depicting enterprise-specific customized content surfaced with respect to a "Get Started" feature of an enterprise application.

FIG. 10 is a schematic view depicting enterprise-specific customized content 1000A, 10008, and 1000C surfaced with respect to a "Get Started" feature 602 of an enterprise application. As shown in FIG. 10, the enterprise-specific customized content 1000A, 1000B, and 1000C may be presented in various forms and may include enterprise-specific logos, images, links, tools, applications, documents, and the like, depending on the details of the particular implementation.

Furthermore, those skilled in the art will appreciate that the exemplary implementations shown in FIGS. 9A-J and 10 are for illustrative purposes only, and the exact implementation of the enterprise-level application content customization techniques described herein may vary depending on the details of the particular implementation.

It should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. Those skilled in the art will appreciate that the logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like) that is executed on one or more processors of computing systems. Additionally, in various embodiments, all or some of the various methods and processes may also be embodied in executable hardware modules including, but not limited to, system on chips (Sot's), codecs, specially designed processors and/or logic circuits, and the like, on a computing system.

As suggested above, each method or process described herein is typically embodied within computer-executable instruction (or code) modules including individual routines, functions, looping structures, selectors and switches (such as if-then and if-then-else statements), assignments, arithmetic computations, and the like, that, in execution, configure a computing system to operate in accordance with the particular method or process. However, as suggested above, the exact implementation in executable statement of each of the methods or processes is based on various implementation configurations and decisions, including programming languages, compilers, target processors, operating environments, and the linking or binding operation. Those skilled in the art will readily appreciate that the logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

Examples

Example 1 is a method for enterprise-level application content customization. The method is implemented in a computing system including a processor. The method includes executing, via a network, an enterprise application on a remote computing system operated by an administrator associated with an enterprise, where the enterprise application is included within a suite of enterprise applications that are utilized by the enterprise. The method includes surfacing, via the network, a content customization user interface (UI) on a display device of the remote computing system during the execution of the enterprise application, where the content customization UI includes UI elements that enable the specification of parameters for providing enterprise-specific customized content during the execution of one or more enterprise applications from the suite of enterprise applications on one or more remote computing systems operated by users associated with the enterprise. The method also includes receiving, via the content customization UI, user input including the specification of the parameters for providing the enterprise-specific customized content during the execution of the enterprise application(s), as well as generating the enterprise-specific customized content in accordance with the specified parameters. The method further includes surfacing, via the network, the generated enterprise-specific customized content on the display device(s) of the remote computing system(s) during the execution of the enterprise application(s).

Example 2 includes the method of example 1, including or excluding optional features. In this example, the method includes utilizing, via the processor, a customer engagement platform experimentation framework to perform at least one of: automatically determining, via the processor, one or more parameters for providing the enterprise-specific customized content during the execution of the enterprise application(s); or automatically adjusting, via the processor, one or more of the specified parameters for providing the enterprise-specific customized content during the execution of the enterprise application(s).

Example 3 includes the method of example 1 or 2, including or excluding optional features. In this example, the method includes personalizing customization options presented by the UI elements of the content customization UI to the particular enterprise based on at least one of: first enterprise-specific data that are maintained by an application service provider of the suite of enterprise applications; telemetry that are maintained by the application service provider; or second enterprise-specific data that are maintained by the enterprise.

Example 4 includes the method of example 3, including or excluding optional features. In this example, the first enterprise-specific data and/or the telemetry (or a portion thereof) are stored within one or more property graphs that are maintained the application service provider.

Example 5 includes the method of any one of examples 1 to 4, including or excluding optional features. In this example, the method includes receiving, via the content customization UI, the user input including the specification of the parameters for providing the enterprise-specific customized content by receiving user input that defines a targeting policy for generating and surfacing the enterprise-specific customized content with respect to a subset of the users associated with the enterprise.

Example 6 includes the method of any one of examples 1 to 5, including or excluding optional features. In this example, the method includes receiving, via the content customization UI, the user input including the specification of the parameters for providing the enterprise-specific customized content by receiving user input that defines a scheduling policy, a frequency policy, and/or a priority policy for generating and surfacing the enterprise-specific customized content during the execution of the enterprise application(s).

Example 7 includes the method of any one of examples 1 to 6, including or excluding optional features. In this example, the method includes automatically providing, via the processor, cross-surface content coordination during the surfacing of the enterprise-specific customized content across multiple form factors, multiple endpoints, multiple enterprise applications, and/or multiple device types.

Example 8 includes the method of any one of examples 1 to 7, including or excluding optional features. In this example, the method includes tracking, via the processor, performance data associated with the surfaced enterprise-specific customized content; generating, via the processor, a performance report corresponding to the performance data; and displaying the performance report on the display device of the remote computing system operated by the administrator associated with the enterprise.

Example 9 includes the method of any one of examples 1 to 8, including or excluding optional features. In this example, the method includes implementing a two-call pattern process during the surfacing of the content customization UI and the surfacing of the generated enterprise-specific customized content, where the two-call pattern process includes providing two layers of security for the enterprise-specific customized content.

Example 10 includes the method of any one of examples 1 to 9, including or excluding optional features. In this example, the method includes surfacing the content customization UI on the display device of the remote computing system operated by the administrator via at least one of the following feature entry points: a device management feature of the enterprise application; an employee management feature of the enterprise application; and/or an employee engagement feature of the enterprise application.

Example 11 includes the method of any one of examples 1 to 10, including or excluding optional features. In this example, the method includes maintaining the privacy of the enterprise-specific customized content in a manner that prevents other users associated with other enterprises that utilize any of the enterprise applications within the suite of enterprise applications from accessing data associated with the enterprise-specific customized content.

Example 12 includes the method of any one of examples 1 to 11, including or excluding optional features. In this example, the method includes receiving, via the content customization UI, additional user input including an adjustment of one or more parameters for providing the enterprise-specific customized content during the execution of the enterprise application(s); and dynamically adjusting, via the processor, the generation and surfacing of the enterprise-specific customized content in accordance with the adjustment to the parameter(s).

Example 13 includes the method of example 12, including or excluding optional features. In this example, receiving the additional user input includes receiving user input including a selection of a flush command for flushing and deleting at least a portion of the enterprise-specific customized content; and dynamically adjusting the generation and surfacing of the enterprise-specific customized content includes flushing and deleting the at least the portion of the enterprise-specific customized content from the at least one remote computing system in response to the selection of the flush command.

Example 14 includes the method of any one of examples 1 to 13, including or excluding optional features. In this example, the method includes surfacing the enterprise-specific customized content on the display device(s) of the remote computing system(s) via at least one of the following feature endpoints: a lockscreen feature of one or more of the enterprise applications; a desktop feature of one or more of the enterprise applications; an OOBE feature of one or more of the enterprise applications; a "Get Started" feature of one or more of the enterprise applications; an employee tips feature one or more of the enterprise applications; a teaching callout feature of one or more of the enterprise applications; a soft landing feature of one or more of the enterprise applications; and/or an action center feature of one or more of the enterprise applications.

Example 15 includes the method of any one of examples 1 to 14, including or excluding optional features. In this example, the method includes surfacing the enterprise-specific customized content on the display device(s) of the remote computing system(s) in at least one of the following form factors: a pop-up notification; an anchored pop-up; a banner; an icon; a chat message; an embedded UI element; an email; or a push notification.

Example 16 is a server. The server includes a processor, a suite of enterprise applications that are utilized by an enterprise, a communication connection for connecting remote computing systems to the server via a network, and a computer-readable storage medium operatively coupled to the processor. The computer-readable storage medium includes computer-executable instructions that, when executed by the processor, cause the processor to: execute, via the network, an enterprise application from the suite of enterprise applications on a remote computing system operated by an administrator associated with the enterprise; surface, via the network, a content customization UI on a display device of the remote computing system during the execution of the enterprise application, where the content customization UI includes UI elements that enable the specification of parameters for providing enterprise-specific customized content during the execution of one or more enterprise applications from the suite of enterprise applications on one or more remote computing systems operated by users associated with the enterprise; receive, via the content customization UI, user input including the specification of the parameters for providing the enterprise-specific customized content during the execution of the enterprise application(s); generate the enterprise-specific customized content in accordance with the specified parameters; and surface, via the network, the generated enterprise-specific customized content on the display device(s) of the remote computing system(s) during the execution of the enterprise application(s).

Example 17 includes the server of example 16, including or excluding optional features. In this example, the computer-readable storage medium includes computer-executable instructions that, when executed by the processor, cause the processor to personalize customization options presented by the UI elements of the content customization UI to the particular enterprise based on at least one of: first enterprise-specific data that are maintained by an application service provider of the suite of enterprise applications; telemetry that are maintained by the application service provider; or second enterprise-specific data that are maintained by the enterprise.

Example 18 includes the server of example 16 or 17, including or excluding optional features. In this example, the computer-readable storage medium includes computer-executable instructions that, when executed by the processor, cause the processor to perform at least one of: receive, via the content customization UI, the user input including the specification of the parameters for providing the enterprise-specific customized content by receiving user input that defines a targeting policy for generating and surfacing the enterprise-specific customized content with respect to a subset of the users associated with the enterprise; or receive, via the content customization UI, the user input including the specification of the parameters for providing the enterprise-specific customized content by receiving user input that defines a scheduling policy, a frequency policy, and/or a priority policy for generating and surfacing the enterprise-specific customized content during the execution of the enterprise application(s).

Example 19 includes the sever of any one of examples 16 to 18, including or excluding optional features. In this example, the computer-readable storage medium includes computer-executable instructions that, when executed by the processor, cause the processor to automatically provide cross-surface content coordination during the generation and surfacing of the enterprise-specific customized content across multiple form factors, multiple endpoints, multiple enterprise applications, and/or multiple device types.

Example 20 is a computer-readable storage medium. The computer-readable storage medium includes computer-executable instructions that, when executed by a processor, cause the processor to: execute, via a network, an enterprise application on a remote computing system operated by an administrator associated with an enterprise, where the enterprise application is included within a suite of enterprise applications that are utilized by the enterprise; surface, via the network, a natively-integrated content customization Ui on a display device of the remote computing system during the execution of the enterprise application, where the content customization UI includes UI elements that enable the specification of parameters for providing enterprise-specific customized content during the execution of one or more enterprise applications from the suite of enterprise applications on one or more remote computing systems operated by users associated with the enterprise, where customization options presented by the UI elements are personalized to the enterprise based enterprise-specific data and/or telemetry that are maintained by an application service provider of the suite of enterprise applications and/or enterprise-specific data that are maintained by the enterprise; receive, via the content customization UI, user input including the specification of the parameters for providing the enterprise-specific customized content during the execution of the enterprise application(s); generate the enterprise-specific customized content in accordance with the specified parameters; and surface, via the network, the generated enterprise-specific customized content on the display device(s) of the remote computing system(s) during the execution of the enterprise application(s).

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for enterprise-level application content customization, wherein the method is implemented via a computing system comprising a processor, and wherein the method comprises:
    executing, via a network, an enterprise application on a remote computing system operated by an administrator associated with an enterprise, wherein the enterprise application is included within a suite of enterprise applications that are utilized by the enterprise;
    surfacing, via the network, a content customization user interface (UI) on a display device of the remote computing system during the execution of the enterprise application, wherein the content customization UI comprises UI elements that enable a specification of parameters for providing enterprise-specific customized content during the execution of at least one enterprise application from the suite of enterprise applications on at least one remote computing system operated by a user associated with the enterprise;
    receiving, via the content customization UI, user input comprising the specification of the parameters for providing the enterprise-specific customized content during the execution of the at least one enterprise application;
    generating the enterprise-specific customized content in accordance with the specified parameters;
    surfacing, via the network, the generated enterprise-specific customized content on a display device of the at least one remote computing system during the execution of the at least one enterprise application;
    receiving, via the content customization UI, additional user input comprising an adjustment of at least a portion of the parameters for providing the enterprise-specific customized content during the execution of the at least one enterprise application; and
    dynamically adjusting the generation and the surfacing of the enterprise-specific customized content in accordance with the adjustment to the at least the portion of the parameters.

2. The method of claim 1, comprising utilizing, via the processor, a customer engagement platform experimentation framework to perform at least one of:
    automatically determining, via the processor, a portion of the parameters for providing the enterprise-specific customized content during the execution of the at least one enterprise application; or
    automatically adjusting, via the processor, at least a portion of the specified parameters for providing the enterprise-specific customized content during the execution of the at least one enterprise application.

3. The method of claim 1, comprising personalizing customization options presented by the UI elements of the content customization UI to the particular enterprise based on at least one of:
    first enterprise-specific data that are maintained by an application service provider of the suite of enterprise applications;
    telemetry that are maintained by the application service provider; or
    second enterprise-specific data that are maintained by the enterprise.

4. The method of claim 3, wherein at least one of the first enterprise-specific data or the telemetry are stored within at least one property graph that is maintained by the application service provider.

5. The method of claim 1, wherein receiving, via the content customization UI, the user input comprising the specification of the parameters for providing the enterprise-specific customized content comprises receiving user input that defines a targeting policy for generating and surfacing the enterprise-specific customized content with respect to a subset of the users associated with the enterprise.

6. The method of claim 1, wherein receiving, via the content customization UI, the user input comprising the specification of the parameters for providing the enterprise-specific customized content comprises receiving user input that defines at least one of a scheduling policy, a frequency policy, or a priority policy for generating and surfacing the enterprise-specific customized content during the execution of the at least one enterprise application.

7. The method of claim 1, comprising automatically providing, via the processor, cross-surface content coordination during the surfacing of the enterprise-specific customized content across at least one of multiple form factors, multiple endpoints, multiple enterprise applications, or multiple device types.

8. The method of claim 1, further comprising:
    tracking, via the processor, performance data associated with the surfaced enterprise-specific customized content;
    generating, via the processor, a performance report corresponding to the performance data; and
    displaying the performance report on the display device of the remote computing system operated by the administrator associated with the enterprise.

9. The method of claim 1, comprising implementing a two-call pattern process during the surfacing of the content customization UI and the surfacing of the generated enterprise-specific customized content, wherein the two-call pattern process comprises providing two layers of security for the enterprise-specific customized content.

10. The method of claim 1, comprising surfacing the content customization UI on the display device of the remote computing system operated by the administrator via at least one of the following feature entry points:
    a device management feature of the enterprise application;
    an employee management feature of the enterprise application; or
    an employee engagement feature of the enterprise application.

11. The method of claim 1, comprising maintaining a privacy of the enterprise-specific customized content in a manner that prevents other users associated with other enterprises that utilize any of the enterprise applications within the suite of enterprise applications from accessing data associated with the enterprise-specific customized content.

12. The method of claim 1, wherein receiving the additional user input comprises receiving user input comprising a selection of a flush command for flushing and deleting at least a portion of the enterprise-specific customized content; and wherein dynamically adjusting the generation and surfacing of the enterprise-specific customized content comprises flushing and deleting the at least the portion of the enterprise-specific customized content from the at least one remote computing system in response to the selection of the flush command.

13. The method of claim 1, comprising surfacing the enterprise-specific customized content on the display device of the at least one remote computing system via at least one of the following feature endpoints:

a lockscreen feature of the at least one enterprise application;
a desktop feature of the at least one enterprise application;
an out-of-box experience (OOBE) feature of the at least one enterprise application;
a "Get Started" feature of the at least one enterprise application;
an employee tips feature of the at least one enterprise application;
a teaching callout feature of the at least one enterprise application;
a soft landing feature of the at least one enterprise application; or
an action center feature of the at least one enterprise application.

14. The method of claim 1, comprising surfacing the enterprise-specific customized content on the display device of the at least one remote computing system in at least one of the following form factors:
a pop-up notification;
an anchored pop-up;
a banner;
an icon;
a chat message;
an embedded UI element;
an email; or
a push notification.

15. A server, comprising:
a processor;
a suite of enterprise applications that are utilized by an enterprise;
a communication connection for connecting remote computing systems to the server via a network; and
a computer-readable storage medium operatively coupled to the processor, the computer-readable storage medium comprising computer-executable instructions that, when executed by the processor, cause the processor to:
execute, via the network, an enterprise application from the suite of enterprise applications on a remote computing system operated by an administrator associated with the enterprise;
surface, via the network, a content customization user interface (UI) on a display device of the remote computing system during the execution of the enterprise application, wherein the content customization UI comprises UI elements that enable a specification of parameters for providing enterprise-specific customized content during the execution of at least one enterprise application from the suite of enterprise applications on at least one remote computing system operated by a user associated with the enterprise;
receive, via the content customization UI, user input comprising the specification of the parameters for providing the enterprise-specific customized content during the execution of the at least one enterprise application;
generate the enterprise-specific customized content in accordance with the specified parameters;
surface, via the network, the generated enterprise-specific customized content on a display device of the at least one remote computing system during the execution of the at least one enterprise application;
receive, via the content customization UI, additional user input comprising an adjustment of at least a portion of the parameters for providing the enterprise-specific customized content during the execution of the at least one enterprise application; and
dynamically adjust the generation and the surfacing of the enterprise-specific customized content in accordance with the adjustment to the at least the portion of the parameters.

16. The server of claim 15, wherein the computer-readable storage medium comprises computer-executable instructions that, when executed by the processor, cause the processor to personalize customization options presented by the UI elements of the content customization UI to the particular enterprise based on at least one of:
first enterprise-specific data that are maintained by an application service provider of the suite of enterprise applications;
telemetry that are maintained by the application service provider; or
second enterprise-specific data that are maintained by the enterprise.

17. The server of claim 15, wherein the computer-readable storage medium comprises computer-executable instructions that, when executed by the processor, cause the processor to perform at least one of:
receive, via the content customization UI, the user input comprising the specification of the parameters for providing the enterprise-specific customized content by receiving user input that defines a targeting policy for generating and surfacing the enterprise-specific customized content with respect to a subset of the users associated with the enterprise; or
receive, via the content customization UI, the user input comprising the specification of the parameters for providing the enterprise-specific customized content by receiving user input that defines at least one of a scheduling policy, a frequency policy, or a priority policy for generating and surfacing the enterprise-specific customized content during the execution of the at least one enterprise application.

18. The server of claim 15, wherein the computer-readable storage medium comprises computer-executable instructions that, when executed by the processor, cause the processor to automatically provide cross-surface content coordination during the generation and surfacing of the enterprise-specific customized content across at least one of multiple form factors, multiple endpoints, multiple enterprise applications, or multiple device types.

19. A computer-readable storage medium comprising computer-executable instructions that, when executed by a processor, cause the processor to:
execute, via a network, an enterprise application on a remote computing system operated by an administrator associated with an enterprise, wherein the enterprise application is included within a suite of enterprise applications that are utilized by the enterprise;
surface, via the network, a natively-integrated content customization user interface (UI) on a display device of the remote computing system during the execution of the enterprise application, wherein the content customization UI comprises UI elements that enable a specification of parameters for providing enterprise-specific customized content during the execution of at least one enterprise application from the suite of enterprise applications on at least one remote computing system operated by a user associated with the enterprise, wherein customization options presented by the UI elements are personalized to the enterprise based on at least one of:

first enterprise-specific data that are maintained by an application service provider of the suite of enterprise applications;

telemetry that are maintained by the application service provider; or second enterprise-specific data that are maintained by the enterprise;

receive, via the content customization UI, user input comprising the specification of the parameters for providing the enterprise-specific customized content during the execution of the at least one enterprise application;

generate the enterprise-specific customized content in accordance with the specified parameters;

surface, via the network, the generated enterprise-specific customized content on a display device of the at least one remote computing system during the execution of the at least one enterprise application;

receive, via the content customization UI, additional user input comprising an adjustment of at least a portion of the parameters for providing the enterprise-specific customized content during the execution of the at least one enterprise application; and dynamically adjust the generation and the surfacing of the enterprise-specific customized content in accordance with the adjustment to the at least the portion of the parameters.

* * * * *